(12) United States Patent
Priyanto et al.

(10) Patent No.: US 11,510,173 B2
(45) Date of Patent: Nov. 22, 2022

(54) USER EQUIPMENT POSITIONING ESTIMATION IN WIRELESS NETWORKS WITH BASE STATIONS THAT SUPPORT MULTIBEAM OPERATION

(71) Applicant: SONY GROUP CORPORATION, Tokyo (JP)

(72) Inventors: Basuki Priyanto, Lund (SE); Anders Berggren, Lund (SE)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/281,092

(22) PCT Filed: Sep. 27, 2019

(86) PCT No.: PCT/US2019/053403
§ 371 (c)(1),
(2) Date: Mar. 29, 2021

(87) PCT Pub. No.: WO2020/069283
PCT Pub. Date: Apr. 2, 2020

(65) Prior Publication Data
US 2021/0345289 A1    Nov. 4, 2021

Related U.S. Application Data

(60) Provisional application No. 62/738,447, filed on Sep. 28, 2018.

(30) Foreign Application Priority Data

Sep. 27, 2018   (SE) ..................................... 1830267-9

(51) Int. Cl.
*H04W 16/28*    (2009.01)
*H04W 64/00*    (2009.01)

(52) U.S. Cl.
CPC ......... *H04W 64/006* (2013.01); *H04W 16/28* (2013.01)

(58) Field of Classification Search
CPC ... H04W 64/006; H04W 16/28; G01S 1/0428; G01S 1/20; G01S 1/44; G01S 5/10;
(Continued)

(56) References Cited

U.S. PATENT DOCUMENTS

2009/0103447 A1\* 4/2009 Harada ................. H04L 1/1887
370/252
2015/0296359 A1  10/2015 Edge
(Continued)

FOREIGN PATENT DOCUMENTS

EP    3217736 A1    9/2017
EP    3282784 A1    2/2018

OTHER PUBLICATIONS

International Search Report and Written Opinion corresponding to PCT/US2019/053403; dated Dec. 19, 2019 (13 pages).
(Continued)

*Primary Examiner* — Siu M Lee
(74) *Attorney, Agent, or Firm* — Myers Bigel, P.A.

(57) ABSTRACT

A method of operating a base station includes determining a schedule associated with transmission by the base station of a Positioning Reference Signal (PRS) on a plurality of directional beams, the plurality of directional beams having directions corresponding to at least a portion of a plurality of configurable beam directions, the schedule being based on a coordination of the PRS transmission by the base station with PRS transmission on directional beams from at least one other base station; and transmitting the PRS on each of the plurality of directional beams based on the determined schedule.

19 Claims, 15 Drawing Sheets

```
                    ( BEGIN )
                        │
                        ▼
┌─────────────────────────────────────────────────────────────────┐
│ DETERMINING A SCHEDULE ASSOCIATED WITH TRANSMISSION BY THE BASE  │
│ STATION OF A POSITIONING REFERENCE SIGNAL (PRS) ON A PLURALITY   │─400
│ OF DIRECTIONAL BEAMS, THE PLURALITY OF DIRECTIONAL BEAMS HAVING  │
│ DIRECTIONS CORRESPONDING TO AT LEAST A PORTION OF A PLURALITY    │
│ OF CONFIGURABLE BEAM DIRECTIONS                                  │
└─────────────────────────────────────────────────────────────────┘
                        │
                        ▼
┌─────────────────────────────────────────────────────────────────┐
│ TRANSMITTING THE PRS ON EACH OF THE PLURALITY OF DIRECTIONAL     │─405
│ BEAMS BASED ON THE DETERMINED SCHEDULE                           │
└─────────────────────────────────────────────────────────────────┘
                        │
                        ▼
                    ( END )
```

(58) Field of Classification Search
CPC .... G01S 5/0036; G01S 5/0215; G01S 5/0226; H04L 5/0023; H04L 5/0035; H04L 5/0048; H04L 27/2611; H04B 7/0617
See application file for complete search history.

(56) References Cited

U.S. PATENT DOCUMENTS

| | | | |
|---|---|---|---|
| 2017/0366244 A1 | 12/2017 | Lee et al. | |
| 2017/0374637 A1* | 12/2017 | Akkarakaran | G01S 5/10 |
| 2020/0021946 A1* | 1/2020 | Kumar | G01S 1/0428 |
| 2021/0345147 A1* | 11/2021 | Zhang | H04W 24/10 |

OTHER PUBLICATIONS

"Japanese Office Action", corresponding to JP 2021-517285; dated May 17, 2022, (7 pages, including English translation).

* cited by examiner

USER EQUIPMENT POSITIONING ESTIMATION IN WIRELESS NETWORKS WITH BASE STATIONS THAT SUPPORT MULTIBEAM OPERATION

CROSS-REFERENCE TO RELATED APPLICATIONS

The present application is a 35 U.S.C. § 371 national stage application of PCT Application No. PCT/US2019/053403, which claims priority to Swedish Patent Application No. 1830267-9, filed Sep. 27, 2018 and U.S. Provisional Patent Application Ser. No. 62/738,447 filed Sep. 28, 2018, the entire contents which are incorporated herein by reference in their entireties. The above-referenced PCT Application was published in the English language as International Publication No. WO 2020/069283 A1 on Apr. 2, 2020.

FIELD

The present inventive concepts relate generally to wireless communication networks and, more particularly, user equipment (UE) positioning estimation in wireless communication networks.

BACKGROUND

Observed Time Difference of Arrival (OTDOA) is a Radio Access Technology (RAT) dependent positioning technique that has been widely deployed in Long Term Evolution (LTE) networks. A device/user equipment (UE) receives reference signals from multiple base stations (eNode-B) and then performs timing difference of arrival (TDOA) measurements. The measurement results are transmitted using the LTE Positioning Protocol (LPP) from the UE to a location server (LS) via an eNode-B. The LS then performs the positioning estimation based on measurement results from at least three eNode-B facilities using triangulation.

A Positioning Reference Signal (PRS) is one of the reference signals in LTE that is used to facilitate a UE positioning determination based on the OTDOA method. The basic operation of calculating time of arrival (TOA) from each eNodeB can be described as follows: First the UE receives the reference signals, e.g., PRS, and then performs cross-correlation with locally generated reference signals. Cross-correlation from different transmission antennas, receiver antennas, and sub-frames can be accumulated, so that good cross-correlation peak can be obtained. The measured time delay can be obtained from the phase information of the cross-correlation peak. The previous operations are repeated to obtain the time delay from several eNodeBs (e.g., a reference eNodeB and neighbor eNodeBs). A Reference Signal Time Different (RSTD) measurement is obtained by subtracting the time delay of a neighbor eNodeB from the time delay of a reference (serving) eNodeB. The UE may also evaluate and classify the RSTD measurement quality. The UE sends all of the RSTD measurements and the RSTD measurement quality information to the LS, which determines a positioning estimate for the UE.

In LTE, the PRS is transmitted by the eNodeB under the assumption that the eNodeB has an omni-directional/sector antenna, but there is no indication of the beam aspect of the antenna being used in transmitting the PRS. Similarly, the UE is expected to use an omni-directional or relatively wide antenna for receiving the beam carrying the PRS. The UE may receive the PRS while the UE is within the cell associated with the eNodeB transmitting the PRS signal.

SUMMARY

According to some embodiments of the inventive concept, a method of operating a base station includes determining a schedule associated with transmission by the base station of a Positioning Reference Signal (PRS) on a plurality of directional beams, the plurality of directional beams having directions corresponding to at least a portion of a plurality of configurable beam directions, the schedule being based on a coordination of the PRS transmission by the base station with PRS transmission on directional beams from at least one other base station; and transmitting the PRS on each of the plurality of directional beams based on the determined schedule.

In other embodiments, the base station is a first base station, wherein the at least one other base station comprises a second base station, and wherein the schedule for the transmission of the PRS on each of the plurality of directional beams is determined by coordinating the PRS transmissions from the first base station with PRS transmissions scheduled to be transmitted on directional beams from the second base station such that the PRS transmissions from the first base station and the PRS transmissions from the second base station occur within a predetermined time period.

In still other embodiments, the schedule for the transmission of the PRS on each of the plurality of directional beams is determined such that the PRS transmissions transmitted from the first base station are coordinated with the PRS transmissions scheduled to be transmitted on the directional beams from the second base station in a defined geographic region.

In still other embodiments, the schedule for the transmission of the PRS on each of the plurality of directional beams is determined such that the PRS transmissions transmitted from the first base station are coordinated with the PRS transmissions scheduled to be transmitted on the directional beams from the second base station based on reducing interference between the PRS transmissions transmitted from the first base station and PRS transmissions transmitted from the second base station through multiplexing of first resources associated with the PRS transmissions transmitted from the first base station and second resources associated with PRS transmissions transmitted from the second base station.

In still other embodiments, the first resources comprise first sub-frequencies and first time segments and the second resources comprise second sub-frequencies and second time segments.

In still other embodiments, a length of the predetermined time period is based on a movement characteristic of a User Equipment (UE) within the defined geographic region (800).

In still other embodiments, determining the schedule for the transmission of the PRS on each of the plurality of directional beams comprises generating the schedule for the transmission of the PRS on each of the plurality of directional beams so as to complete the transmission of the PRS on each of the plurality of beams within a PRS burst interval.

In still other embodiments, the PRS burst interval is a first one of a plurality of PRS burst intervals. The method further comprises generating the schedule for the transmission of the PRS on each of the plurality of directional beams so as to complete the transmission of the PRS on each of the plurality of beams within each of the plurality PRS burst intervals.

In still other embodiments, respective ones of the plurality of PRS burst intervals are scheduled to occur on a periodic basis.

In still other embodiments, respective ones of the plurality of PRS burst intervals are scheduled to occur consecutively.

In still other embodiments, the method further comprises assigning beam index identifications to the plurality of directional beams, respectively. The schedule is based on the beam index identifications.

In still other embodiments, communicating the schedule, a number of the at least the portion of a plurality of configurable beam directions, a number of the plurality of configurable beam directions, the beam index identifications, bandwidths of the plurality of directional beams, respectively, or time domain characteristics of the plurality of directional beams, respectively, to a positioning node.

In still other embodiments, communicating the schedule, the number of the at least the portion of a plurality of configurable beam directions, the number of the plurality of configurable beam directions, the beam index identifications, the bandwidths of the plurality of directional beams, respectively, or the time domain characteristics of the plurality of directional beams, respectively, to the positioning node is performed following transmission of a Synchronization Signal Block (SSB).

In still other embodiments, the schedule is a resource allocation schedule that identifies time segments and sub-frequencies used for transmission by the base station of the PRS on the plurality of directional beams. The method further comprises assigning beam index identifications to the plurality of directional beams, respectively, the beam index identifications corresponding to pairs of time segment and sub-frequency identifications, respectively. The resource allocation schedule is based on the beam index identifications.

In some embodiments of the inventive concept, a method of operating a User Equipment (UE) comprises receiving from a positioning node, for each of a first base station and a second base station, information associated with transmission of a Positioning Reference Signal (PRS) on a plurality of directional beams, the information comprising a schedule that is based on a coordination of the PRS transmissions on the plurality of directional beams by the first base station and the second base station, and the plurality of directional beams having directions corresponding to at least a portion of a plurality of configurable beam directions, respectively; and receiving a first PRS signal on a first one of the plurality of directional beams from the first base station and a second PRS signal from a second one of the plurality of directional beams second base station based on the schedule, which is based on the coordination of the PRS transmissions.

In further embodiments, the method further comprises performing Observed Time Difference of Arrival (OTDOA) measurements based on the first PRS signal, the second PRS signal, and a third PRS signal received from a third base station; and communicating Reference Signal Time Different Measurement (RSTD) information based on the OTDOA measurements.

In still further embodiments, the information associated with transmission by the first base station of the PRS signal on the plurality of directional beams comprises a number of the at least the portion of a plurality of configurable beam directions, a number of the plurality of configurable beam directions, beam index identifications assigned to ones of the plurality of directional beams, respectively, bandwidths of the plurality of directional beams, respectively, or time domain characteristics of the plurality of directional beams, respectively.

In still further embodiments, the method further comprises communicating (1900), to a positioning node, a beam index identification assigned to the one of the plurality of directional beams on which the first PRS signal is received, an Angle of Arrival (AoA) associated with the one of the plurality of directional beams on which the first PRS signal is received, or an Angle of Departure (AoD) associated with the one of the plurality of directional beams on which the first PRS signal is received.

In still further embodiments, the schedule is a resource allocation schedule that identifies time segments and sub-frequencies used for PRS transmissions by the first base station and the second base station on the plurality of directional beams; and the beam index identifications correspond to pairs of the time segment and the sub-frequency identifications, respectively.

In some embodiments of the inventive concept, a method of operating a positioning node comprises receiving from each of a plurality of base stations information comprising a plurality of configurable beam directions suitable for Positioning Reference Signal (PRS) transmissions; communicating, for each of the plurality of base stations, a schedule associated with transmissions by the respective base station of a PRS on the plurality of directional beams to a User Equipment (UE), the schedule being based on a coordination of the PRS transmissions on the plurality of directional beams by the plurality of base stations; and receiving from the UE Reference Signal Time Different Measurement (RSTD) information based on a first PRS signal transmitted by a first one of the plurality of base stations, a second PRS signal transmitted by a second one of the plurality of base stations, and a third PRS signal transmitted by a third one of the plurality of base stations.

In other embodiments of the inventive concept, the method further comprises communicating, by the positioning node, the schedule to the plurality of base stations, prior to communication of the schedule to the UE. The schedule is generated by the positioning node based on the information received from the plurality of base stations, and the plurality of directional beams have directions corresponding to at least a portion of a plurality of configurable beam directions.

In still other embodiments of the inventive concept, the received information further comprises: a number of the at least the portion of a plurality of configurable beam directions, a number of the plurality of configurable beam directions, beam index identifications assigned to ones of the plurality of directional beams, respectively, bandwidths of the plurality of directional beams, respectively, or time domain characteristics of the plurality of directional beams, respectively.

In still other embodiments of the inventive concept, the method further comprises receiving, from the UE, for each of the first, second, and third ones of the plurality of base stations: a beam index identification assigned to the one of the plurality of directional beams on which the PRS signal is transmitted, an Angle of Arrival (AoA) associated with the one of the plurality of directional beams on which the PRS signal is transmitted, or an Angle of Departure (AoD) associated with the one of the plurality of directional beams on which the PRS signal is transmitted.

In still other embodiments of the inventive concept, the method further comprises determining an Observed Time Difference of Arrival (OTDOA) position for the UE based on the RSTD information, the respective beam index identifications, the respective AoAs, or the respective AoDs.

In still other embodiments of the inventive concept, the schedule is determined such that transmissions of the PRS on the plurality of directional beams by respective ones of the plurality of base stations are coordinated between the respective ones of the plurality of base stations so as to occur within a predetermined time period.

In still other embodiments of the inventive concept, the schedule is determined such that transmissions of the PRS on the plurality of directional beams by respective ones of the plurality of base stations are coordinated between the respective ones of the plurality of base stations in a defined geographic region.

In still other embodiments of the inventive concept, the schedule is determined such that transmissions of the PRS on the plurality of directional beams by respective ones of the plurality of base stations are coordinated between the respective ones of the plurality of base stations based on, for each of the plurality of base stations, reducing interference between the transmissions of the PRS on the plurality of directional beams by the respective one of the plurality of base stations and transmissions on another respective one of the plurality of base stations through multiplexing of first resources associated with the PRS transmissions transmitted from the respective one of the plurality of base stations and second resources associated with the PRS transmissions transmitted from the other respective one of the plurality of base stations.

In still other embodiments of the inventive concept, the schedule is a resource allocation schedule that identifies time segments and sub-frequencies used for transmission by the respective base stations of the PRS on the plurality of directional beams. The beam index identifications correspond to pairs of the time segment and the sub-frequency identifications, respectively.

In some embodiments of the inventive concept, a base station comprises a processor; and a memory coupled to the processor and comprising computer readable program code embodied in the memory that is executable by the processor to perform operations comprising: determining a schedule associated with transmission by the base station of a Positioning Reference Signal (PRS) on a plurality of directional beams, the plurality of directional beams having directions corresponding to at least a portion of a plurality of configurable beam directions, the schedule being based on a coordination of the PRS transmission by the base station with PRS transmission on directional beams from at least one other base station; and transmitting the PRS on each of the plurality of directional beams based on the determined schedule.

In some embodiments of the inventive concept, a User Equipment (UE) device comprises a processor; and a memory coupled to the processor and comprising computer readable program code embodied in the memory that is executable by the processor to perform operations comprising: receiving from a positioning node, for each of a first base station and a second base station, information associated with transmission of a Positioning Reference Signal (PRS) on a plurality of directional beams, the information comprising a schedule that is based on a coordination of the PRS transmissions on the plurality of directional beams by the first base station and the second base station, and the plurality of directional beams having directions corresponding to at least a portion of a plurality of configurable beam directions, respectively; and receiving a first PRS signal on a first one of the plurality of directional beams from the first base station and a second PRS signal from a second one of the plurality of directional beams second base station based on the schedule, which is based on the coordination of the PRS transmissions.

In some embodiments of the inventive concept, a positioning node comprises a processor; and a memory coupled to the processor and comprising computer readable program code embodied in the memory that is executable by the processor to perform operations comprising: receiving from each of a plurality of base stations information comprising a plurality of configurable beam directions suitable for Positioning Reference Signal (PRS) transmissions; communicating, for each of the plurality of base stations, a schedule associated with transmissions by the respective base station of a PRS on the plurality of directional beams to a User Equipment (UE), the schedule being based on a coordination of the PRS transmissions on the plurality of directional beams by the plurality of base stations; and receiving from the UE Reference Signal Time Different Measurement (RSTD) information based on a first PRS signal transmitted by a first one of the plurality of base stations, a second PRS signal transmitted by a second one of the plurality of base stations, and a third PRS signal transmitted by a third one of the plurality of base stations.

It is noted that aspects described with respect to one embodiment may be incorporated in different embodiments although not specifically described relative thereto. That is, all embodiments and/or features of any embodiments can be combined in any way and/or combination. Moreover, other methods, systems, articles of manufacture, and/or computer program products according to embodiments of the inventive subject matter will be or become apparent to one with skill in the art upon review of the following drawings and detailed description. It is intended that all such additional systems, methods, articles of manufacture, and/or computer program products be included within this description, be within the scope of the present inventive subject matter, and be protected by the accompanying claims. It is further intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

Figure 1:
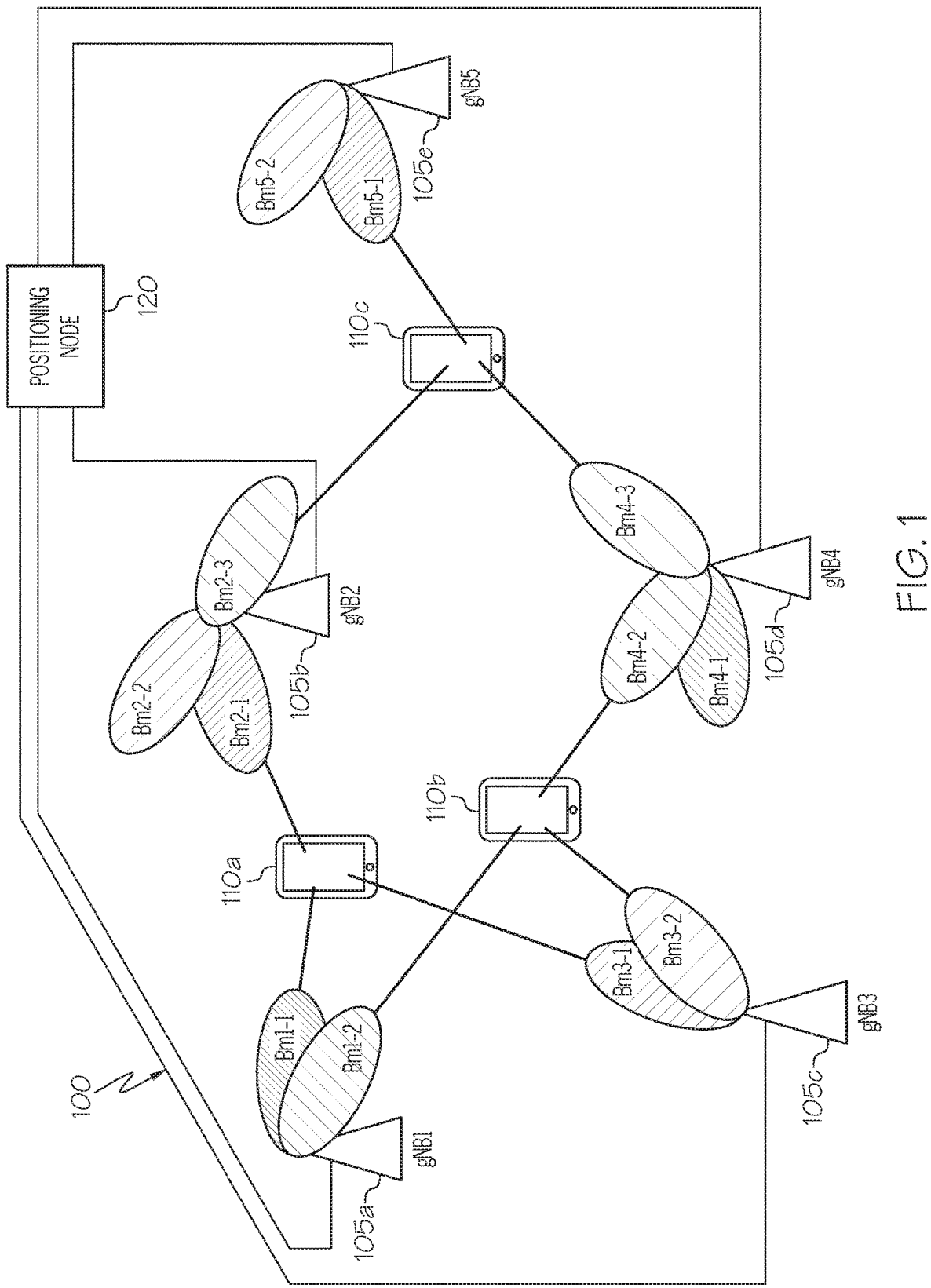
FIG. 1 is a block diagram of a wireless communication network including base stations that support multibeam operation according to some embodiments of the inventive concept.

In the following detailed description, numerous specific details are set forth to provide a thorough understanding of embodiments of the present disclosure. However, it will be understood by those skilled in the art that the present invention may be practiced without these specific details. In some instances, well-known methods, procedures, components and circuits have not been described in detail so as not to obscure the present disclosure. It is intended that all embodiments disclosed herein can be implemented separately or combined in any way and/or combination. Aspects described with respect to one embodiment may be incorporated in different embodiments although not specifically described relative thereto. That is, all embodiments and/or features of any embodiments can be combined in any way and/or combination.

In 5G New Radio (NR) networks, both a base-station, e.g., gNB, and a UE can be configured to support multi-beam operation. For example, the synchronization signal block (SSB) in NR may be configured to operate with up to 64 narrowbeams. Depending on the purposes (e.g. initial access, broadcast transmissions), beams are typically transmitted using a beam sweep in to cover a portion or an entire cell, where the beams are transmitted consecutively in time. As a result the PRS may also be transmitted at different points in time in the different beams. Thus, each individual UE may receive the PRS of one or more of the beams from each gNB. Those PRS of different beams may be transmitted at different points in time.

Some embodiments of the inventive concept stem from a realization that for position estimation of a UE using OTDOA it may be desirable to receive a plurality of PRSs from distinct base stations at or near the same time and be able to calculate the time differences between PRSs transmitted from different base stations accurately enough to estimate the position. Without beam coordination, there could be a case where a UE is unable receive all of the PRSs used for obtaining the RSTD measurements that a location server uses for position determination. Thus, according to some embodiments, a schedule may be generated for one of more of the gNBs in a 5G NR communication network for transmitting the PRS on the various directional beams generated by the individual gNBs. To ensure that a UE receives a sufficient number of beams, e.g., three or more, within a specified time period to perform the Time of Arrival (TOA) measurements for use in the OTDOA location or position estimation methodology, a schedule may be determined in which PRS transmissions on beams associated with different base stations are coordinated. For example, in some embodiments, all PRS transmissions from the various base stations transmitted within a predetermined geographic area may be scheduled to occur within a specified time period, e.g., 0.5 ms. Another criterion used in scheduling the PRS transmissions among the various base stations is to minimize or reduce interference between a base station performing a PRS transmission and one or more other base stations performing beam transmissions (PRS or otherwise) either within a serving cell or a neighbor cell. In some embodiments, the PRS transmissions from the various base stations within a predetermined geographic area may be coordinated to ensure that the time period with which a sufficient number of PRS transmissions are available to a UE is based on a movement characteristic of the UE. For example, if a group of base stations includes beams targeted to a highway in which UEs may be moving in vehicles at relatively high speeds, then the PRS transmissions from the base stations would need to occur within a short time period otherwise the UE may leave the geographic area before a sufficient number of PRS transmissions from different base stations are received.

A UE may receive multiple PRSs from various directional beams associated with different gNBs and may generate RSTD measurements for these signals. The UE may report these RSTD measurements to a positioning node, such as a Serving Mobile Location Center (SMLC) or Location Server (LS), for determining a position estimate of the UE using OTDOA. In addition to the RSTD measurements, the UE may also report to the positioning node one or more of an identification of the particular beams from the individual base station used in the RSTD measurements, an Angle of Arrival (AoA), and an Angle of Departure (AoD) of these beams. The positioning node may use the AoA and/or the AoD information along with the RSTD measurements in performing an OTDOA position estimation for the UE.

FIG. 1 is a block diagram of a wireless communication network 100 including base stations that support multibeam operation according to some embodiments of the inventive concept. The wireless communication network 100 includes five 5G NR base stations gNB1 105a, gNB2, 105b, gNB3 105c, gNB4 105d and gNB5 105e that are configured multiple beam operation. In some embodiments, the base stations gNB1 105a, gNB2, 105b, gNB3 105c, gNB4 105d and gNB5 105e may be configured to generate a plurality of directional beams that are transmitted at different azimuth angles. Each base station gNB1 105a, gNB2, 105b, gNB3 105c, gNB4 105d and gNB5 105e may be configured to transmit a maximum number of different directional beams, such as, for example, 64 beams total in some embodiments. In addition, each base station gNB1 105a, gNB2, 105b, gNB3 105c, gNB4 105d and gNB5 105e may be configured to use less than the maximum number of different directional beams that are configurable for operation. For example, a base station gNB1 105a, gNB2, 105b, gNB3 105c, gNB4 105d and gNB5 105e may be capable of using 64 different directional beams, but may use only 16 directional beams because of a lack of need to transmit in certain geographic directions. Each base station gNB1 105a, gNB2, 105b, gNB3 105e, gNB4 105d and gNB5 105e may allocate one or more sub-frequencies and time segments for transmitting and/or receiving on each beam. Each beam is separated in time and a full cycle from the first active beam to the last active beam may be called a beam sweep.

Figure 2:
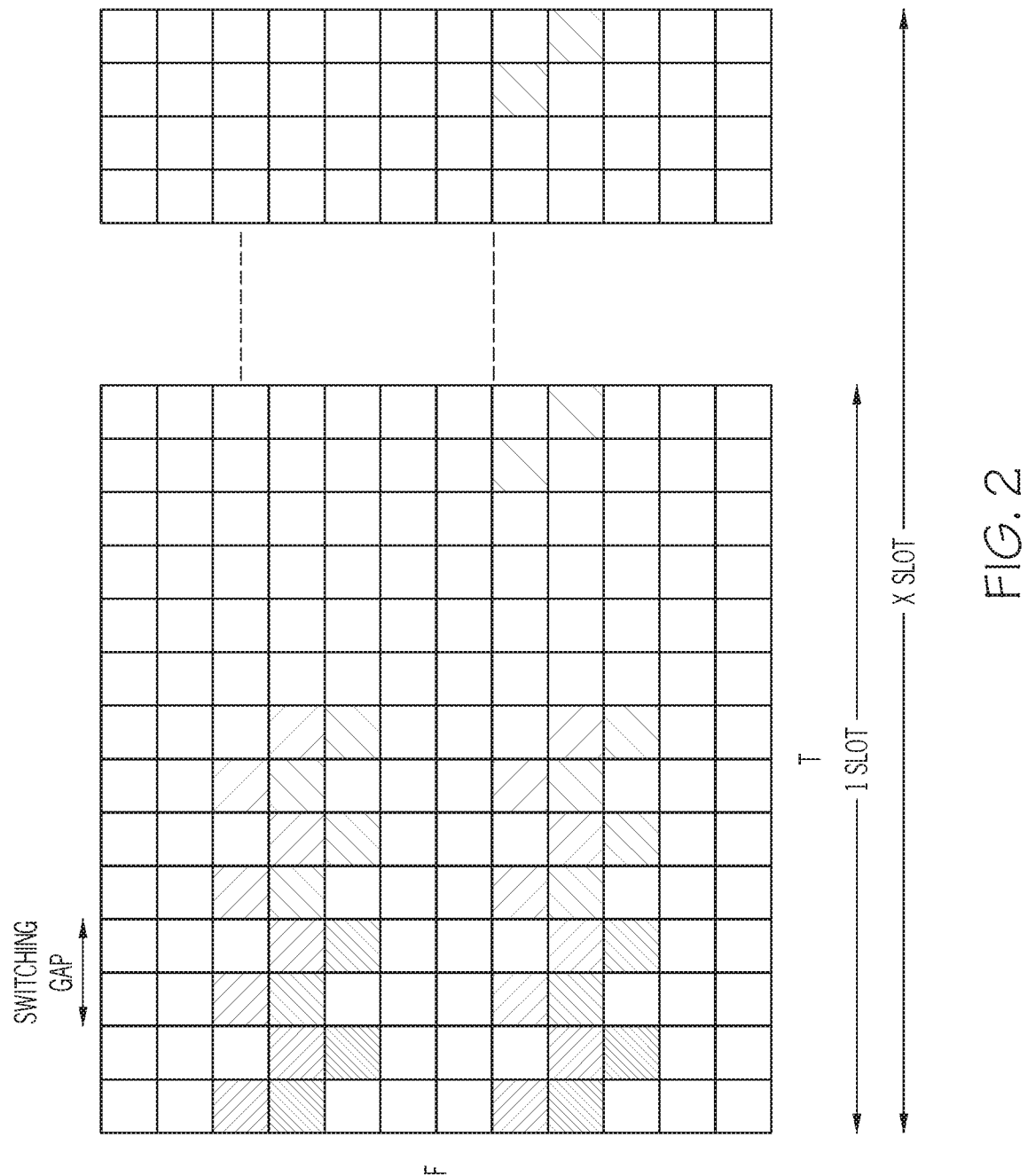
FIG. 2 is a block diagram that illustrates a schedule used by base stations for transmitting a Positioning Reference Signal (PRS) on various beams according to some embodiments of the inventive concept.

The base stations gNB1 105a, gNB2, 105b, gNB3 105c, gNB4 105d and gNB5 105e may transmit a PRS on each of the beams for use in determining the positions of a UE based on the OTDOA protocol. To ensure that the UE can receive the PRS transmissions, a schedule may be generated for each base station stations gNB1 105a, gNB2, 105b, gNB3 105c, gNB4 105d and gNB5 105e. FIG. 2 is a block diagram that illustrates a schedule used by base stations for transmitting a PRS on various beams according to some embodiments of the inventive concept. Referring to FIGS. 1 and 2, base station gNB1 105a, transmits PRSs on beams Bm1-1 and Bm1-2, which are received by UEs 110a and 110b, respectively. Base station gNB2 105b transmits PRSs on beams Bm2-1, Bm2-2, which are received by UEs 110a and 110c, respectively. Base station gNB2 105b also transmits a PRS on beam Bm2-2. Base station gNB3 105c transmits PRSs on beams Bm3-1 and Bm3-2, which are received by UEs 110a and 110b, respectively. Base station gNB4 105d transmits PRSs on beams Bm4-2 and Bm4-3, which are received by UEs 110b and 110c, respectively. Base station gNB4 105d also transmits a PRS on beam Bm4-1. Base station gNB5 105e transmits a PRS on Bm5-1, which is received by UE 110c. Base station gNB5 105e also transmits a PRS on beam Bm5-2. Although each base station gNB1 105a, gNB2, 105b, gNB3 105c, gNB4 105d and gNB5 105e is shown as only transmitting a PRS on two or three beams in FIG. 1, it will be understood that the base stations gNB1 105a, gNB2, 105b, gNB3 105c, gNB4 105d and gNB5 105e may transmit a PRS on more or fewer beams in accordance with various embodiments of the inventive concept. Interference among beams within the serving cell or neighbor cells may be mitigated according to some embodiments. In connected mode, a UE is communicating to a serving cell but may still listen to neighbor cells for measurement. For example, referring to FIG. 1, the serving base station for UE 110a may be the first base-station (105a). The first base-station (105a) may be configured to use beam Bm1-1 while the second base-station (105b) may use beam Bm2-2. Such scheduling reduces interference among beams within the serving cell and/or the neighbor cell. That is, through use of multiplexing in the frequency domain, the time domain, or both, of the sub-frequencies and time segments used for transmission of the PRS signals, interference between PRS transmissions from base stations in the same cell or different cells may be reduced.

As shown in FIG. 2, the base stations gNB1 105a, gNB2, 105b, gNB3 105c, gNB4 105d and gNB5 105e and/or the positioning node 120 coordinate the transmission of the PRSs in accordance with a schedule identifying the sub-frequencies (vertical axis) and time segments (horizontal axis) of transmission. A time slot may be defined, such that a base station gNB1 105a, gNB2, 105b, gNB3 105c, gNB4 105d and gNB5 105e may need an integral (X) number of slots to perform a full beam sweep, i.e., cycle through all operational directional beams. This may be referred to as a PRS burst. A PRS burst may be repeated consecutively with no scheduled time delay between bursts, may be repeated periodically, and/or may be repeated asynchronously based on a request from another entity, such as a UE 110a,b,c or positioning node 120. When switching from one beam to another beam, a switching gap in time may occur. This is shown in FIG. 2 where there is a gap of a particular number M of Orthogonal Frequency Division Multiplexing (OFDM) symbols (shown as two squares in FIG. 2) when switching from beam Bm2-1 to beam Bm2-2. During this gap, however, other base stations may transmit PRSs. In the example shown in FIG. 2 base stations gNB3 105c and gNB4 105d transmit during the switching gap for base station gNB2.

Each UE 110a,b,c may receive PRSs from at least three different ones of the base stations gNB1 105a, gNB2, 105b, gNB3 105c, gNB4 105d and gNB5 105e and may generate RSTD measurements for these signals. The UEs 110a,b,c may report these RSTD measurements to the positioning node 120, e.g., a Location Server (LS) or Serving Mobile Location Center (SMLC) by way of the base stations gNB1 105a, gNB2, 105b, gNB3 105c, gNB4 105d and gNB5 15e for determining a position estimate of the UE 105a,b,c using OTDOA. In addition to the RSTD measurements, the UE 105a,b,c may also report to the positioning node 120 one or more of an identification of the particular beams from the individual base station used in the RSTD measurements, an Angle of Arrival (AoA), and an Angle of Departure (AoD) of these beams. The positioning node 120 may use the AoA and/or the AoD information along with the RSTD measurements in performing an OTDOA position estimation for the UE 110a,b,c.

Figure 3:
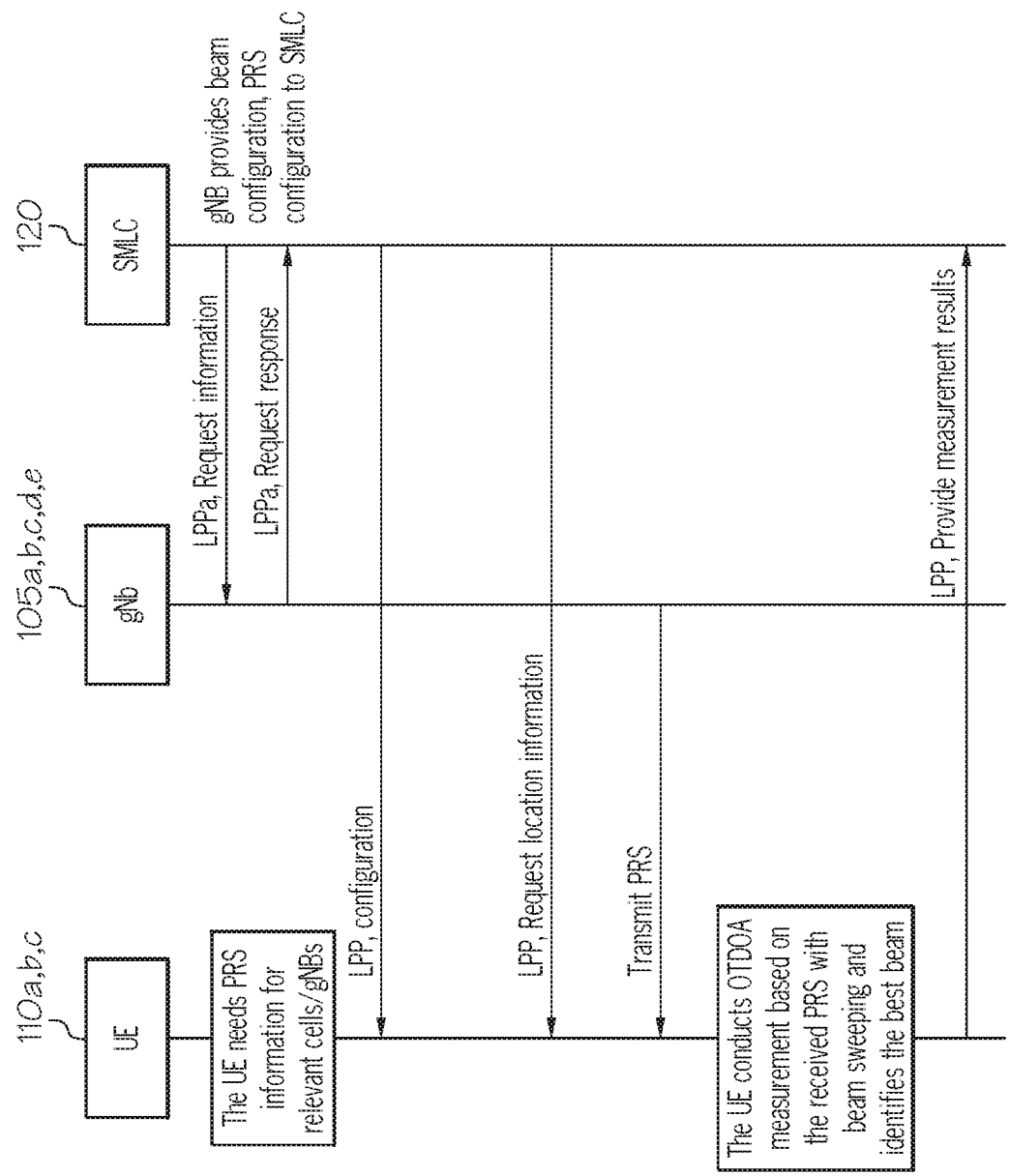
FIG. 3 is a message flow diagram that illustrates communications between a base station, User Equipment (UE), and a positioning node according to some embodiments of the inventive concept.

FIG. 3 is a message flow diagram that illustrates communications between a base station gNB1 105a, gNB2, 105b, gNB3 105c, gNB4 105d and gNB5 105e, a UE 110a,b,c, and a positioning node 120 according to some embodiments of the inventive concept. As shown in FIG. 3, the positioning node 120 may request beam configuration and/or PRS scheduling information from one or more of the base stations gNB1 105a, gNB2, 105b, gNB3 105c, gNB4 105d and gNB5 105e using the LTE Positioning Protocol Annex (LPPa). The various base stations gNB1 105a, gNB2, 105b, gNB3 105c, gNB4 105d and gNB5 105e respond to the positioning node 120 with the requested beam configuration and/or PRS scheduling information by way of the LPPa protocol. The positioning node 120 uses the LPP to provide the various UEs 110a,b,c with the beam configuration and/or the PRS scheduling information for the base stations gNB1 105a, gNB2, 105b, gNB3 105c, gNB4 105d and gNB5 105e. At a later point in time, the positioning node 120 sends a request to the various UEs 110a,b,c for the location information, i.e., the RSTD information, the beam index or identification information, the AoA information, and/or the AoD information for use in the OTDOA location determination. The base stations gNB1 105a, gNB2, 105b, gNB3 105c, gNB4 105d and gNB5 105e transmit the PRSs on their various beams during a beam sweep, which are received by the various UEs 110a,b,c. The UEs 110a,b,c use the best beams from at least three different base stations gNB1 105a, gNB2, 105b, gNB3 105c, gNB4 105d and gNB5 105e to collect beam index identification information, AoA information, and/or AoD information, along with performing OTDOA measurements to generate RSTD information, which are then communicated to the positioning node 120 using the LPP. The positioning node 120 may use the received measurement results (RSTD information) along with the beam index information, AoA information, and/or AoD information to estimate an OTDOA position for the UE.

Figure 4:
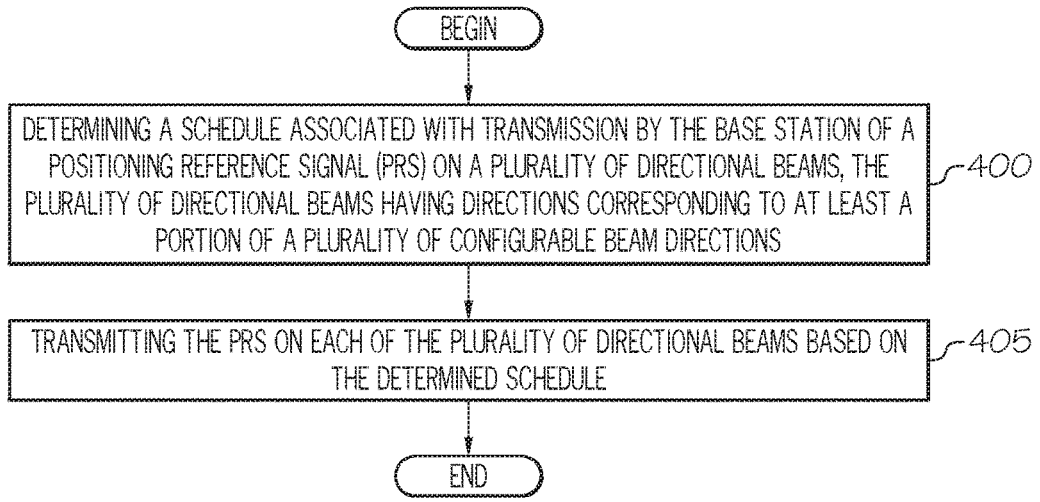
FIGS. 4-27 are flowcharts that illustrate operations for UE positioning estimation in wireless networks with base stations that support multibeam operation according to some embodiments of the inventive concept.

FIGS. 4-21 are flowcharts that illustrate operations for UE positioning estimation in wireless networks with base stations that support multibeam operation according to some embodiments of the inventive concept. Referring to FIG. 4, operations of a base station, such as one or more of the base stations gNB1 105a, gNB2, 105b, gNB3 105c, gNB4 105d and gNB5 105e of FIG. 1, may comprise determining a schedule associated with transmission by the base station of a Positioning Reference Signal (PRS) on a plurality of directional beams, the plurality of directional beams having directions corresponding to at least a portion of a plurality of configurable beam directions (block 400). The schedule may be generated at the base station gNB1 105a, gNB2, 105b, gNB3 105c, gNB4 105d and gNB5 105e, generated at the positioning server 120, and/or generated in part at the base station gNB1 105a, gNB2, 105b, gNB3 105c, gNB4 105d and gNB5 105e and in part at the positioning server. The PRS is transmitted on each of the plurality of directional beams based on the determined schedule (block 405).

Figure 5:
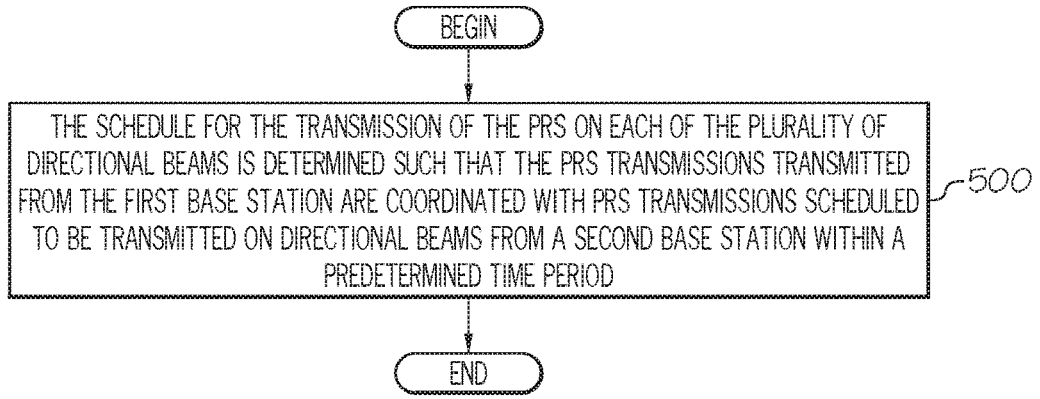
Figure 6:
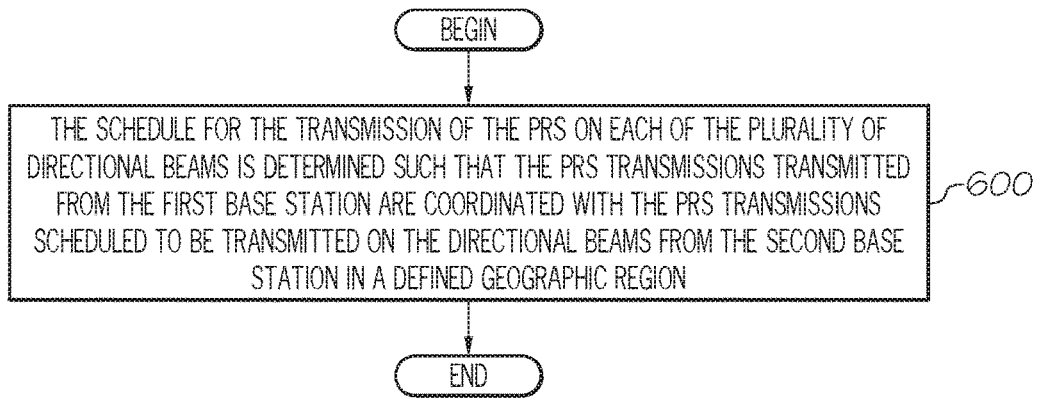
Figure 7:
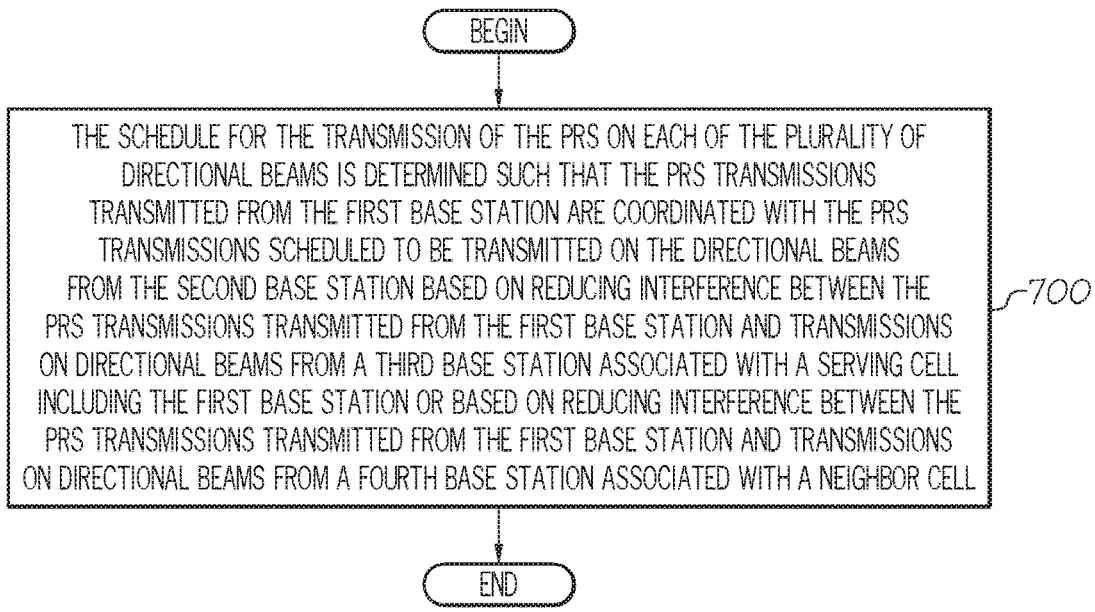
Figure 8:
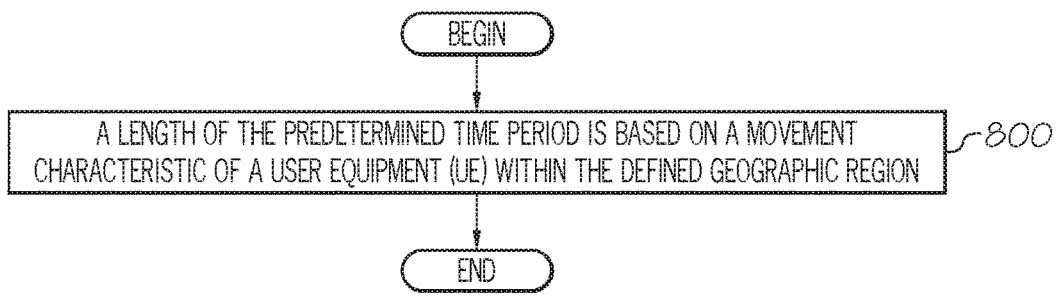

Referring to FIG. 5, the PRS transmission schedule along with the selection of which beams to configure may be coordinated among various base stations gNB1 105a, gNB2, 105b, gNB3 105c, gNB4 105d and gNB5 105e to ensure that a UE 110a,b,c can receive a sufficient number of PRS transmissions from different base stations to perform the TOA measurements used in the OTDOA methodology. For example, the schedule for the transmission of the PRS on each of the plurality of directional beams is determined such that the PRS transmissions transmitted from a first base station are coordinated or arranged with PRS transmissions scheduled to be transmitted on directional beams from a second base station within a predetermined time period (block 500).

In some embodiments, all PRS transmissions from the various base stations gNB1 105a, gNB2, 105b, gNB3 105c, gNB4 105d and gNB5 105e transmitted within a predetermined geographic area may be scheduled to occur within a specified time period, e.g., 0.5 ms. Thus, referring to FIG. 6, the schedule for the transmission of the PRS on each of the plurality of directional beams may be determined such that the PRS transmissions transmitted from a first base station are coordinated with the PRS transmissions scheduled to be transmitted on the directional beams from a second base station in a defined geographic region (block 600).

Another criterion used in scheduling the PRS transmissions among the various base stations gNB1 105a, gNB2, 105b, gNB3 105e, gNB4 105d and gNB5 105e is to minimize or reduce interference between a base station performing a PRS transmission and one or more other base stations performing beam transmissions (PRS or otherwise) either within a serving cell or a neighbor cell. Thus, referring to FIG. 7, the schedule for the transmission of the PRS on each of the plurality of directional beams may be determined such that the PRS transmissions transmitted from a first base station are coordinated with the PRS transmissions scheduled to be transmitted on the directional beams from a second base station based on reducing interference between the PRS transmissions transmitted from the first base station and transmissions on directional beams from a third base station associated with a serving cell such as the first base station or based on reducing interference between the PRS transmissions transmitted from the first base station and transmissions on directional beams from a fourth base station associated with a neighbor cell as the first base station (block 700)

In some embodiments, the PRS transmissions from the various base stations within a predetermined geographic area may be coordinated to ensure that the time period with which a sufficient number of PRS transmissions are available to a UE is based on a movement characteristic of the UE. Thus, referring to FIG. 8, a length of the predetermined time period may be based on a movement characteristic of a UE 110a,b,c within the defined geographic region (block 800). For example, a network may configure with a given time period that is designed to support all UEs, such as UE that are fast, slow, or static. A UE traveling at a high speed may only have a chance to read a smaller portion of the given time period X.

Figure 9:
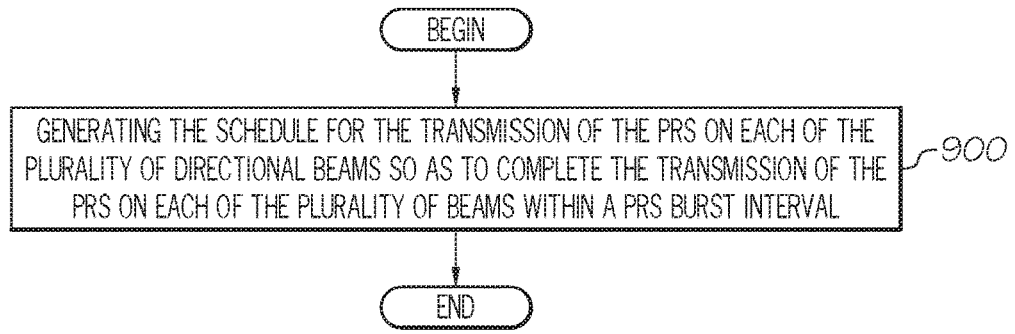
Figure 10:
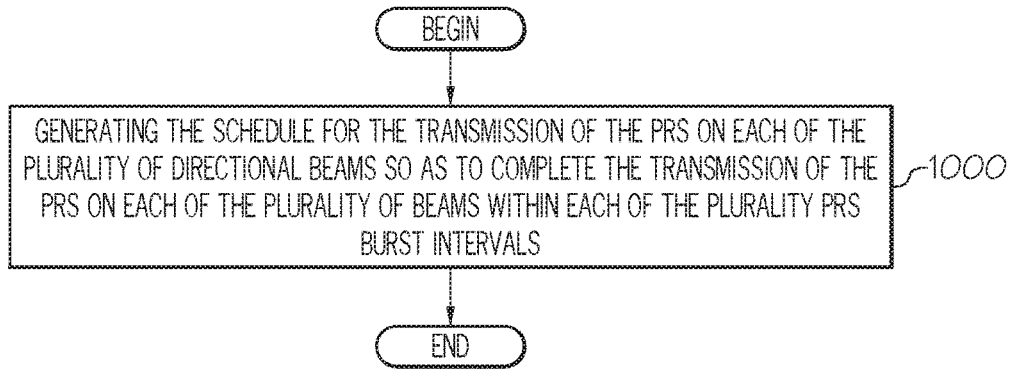

Referring to FIG. 9, a base station gNB1 105a, gNB2, 105b, gNB3 105c, gNB4 105d and/or gNB5 105e may generate the schedule for the transmission of the PRS on each of the plurality of directional beams so as to complete the transmission of the PRS on each of the plurality of beams within a PRS burst interval (block 900).

Figure 11:
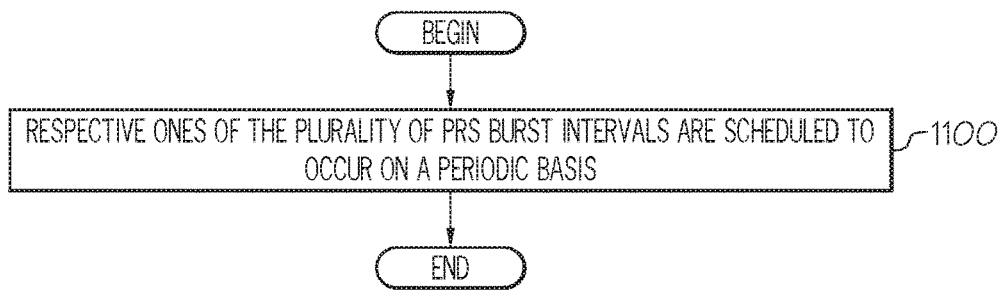
Figure 12:
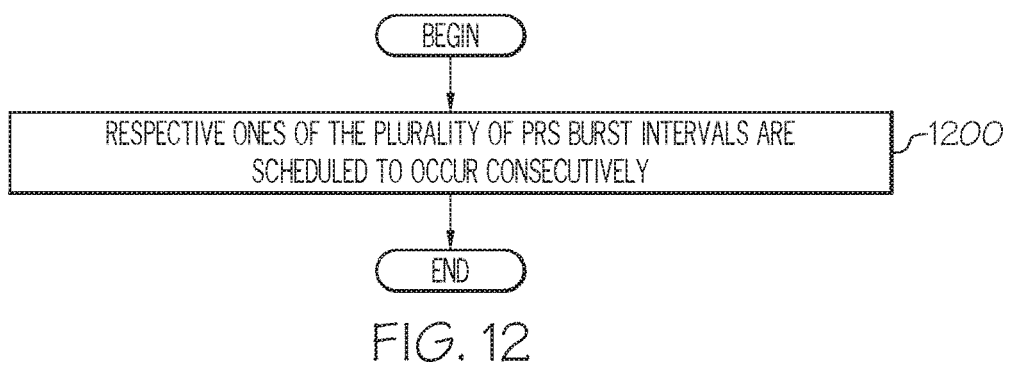

A PRS burst may be repeated consecutively with no scheduled time delay between bursts, may be repeated periodically, and/or may be repeated asynchronously based on a request from another entity, such as a UE 110a,b,c or positioning node 120. Thus, referring to FIG. 10, the PRS burst interval may be a first one of a plurality of PRS burst intervals. The schedule for the transmission of the PRS on each of the plurality of directional beams may be configured so as to complete the transmission of the PRS on each of the plurality of beams within each of the plurality PRS burst intervals (block 1000). Referring to FIG. 11, respective ones of the plurality of PRS burst intervals may be scheduled to occur on a periodic basis (block 1100). In other embodiments, referring to FIG. 12, respective ones of the plurality of PRS burst intervals may be scheduled to occur consecutively without any scheduled delay therebetween (block 1200).

Figure 13:
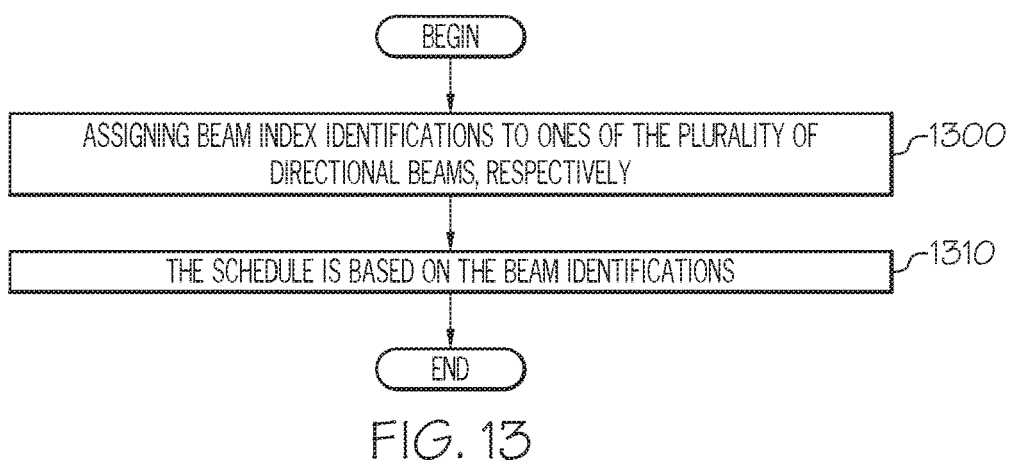
Figure 14:
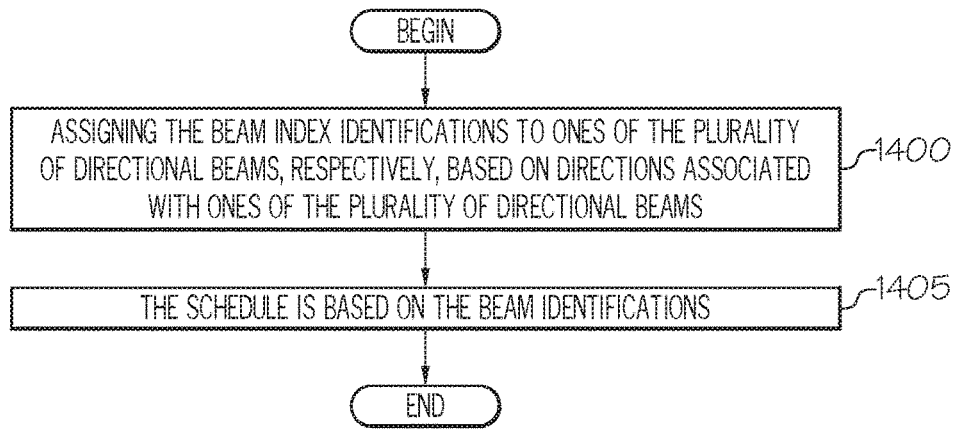

Referring to FIG. 13, in some embodiments, the base stations gNB1 105a, gNB2, 105b, gNB3 105c, gNB4 105d and/or gNB5 105e may assign beam index identifications to ones of the plurality of directional beams, respectively (block 1300). The PRS transmission schedule may be based on these beam identifications (block 1310). The beam identification information may be assigned in different ways in accordance with various embodiments of the inventive concept. Referring to FIG. 14, the beam index identifications may be assigned to ones of the plurality of directional beams, respectively, based on directions associated with ones of the plurality of directional beams (block 1400). This may be viewed as an implicit beam identification assignment. For example, beam index-1 may be transmitted first followed by beam index-2, etc. In some embodiments, beam index-1 may be specified as a beam towards a particular direction, e.g., north, with subsequently transmitted beams being transmitted in a clockwise rotation. The PRS transmission schedule may be based on the beam identifications (block 1405). In other embodiments, the beam identification assignment is an explicit identification assigned to each beam irrespective of the direction of transmission for the various beams. Base stations gNB1 105a, gNB2, 105b, gNB3 105c, gNB4 105d and/or gNB5 105e may also transmit cell identification information with the PRS signal via the various beams.

Figure 15:
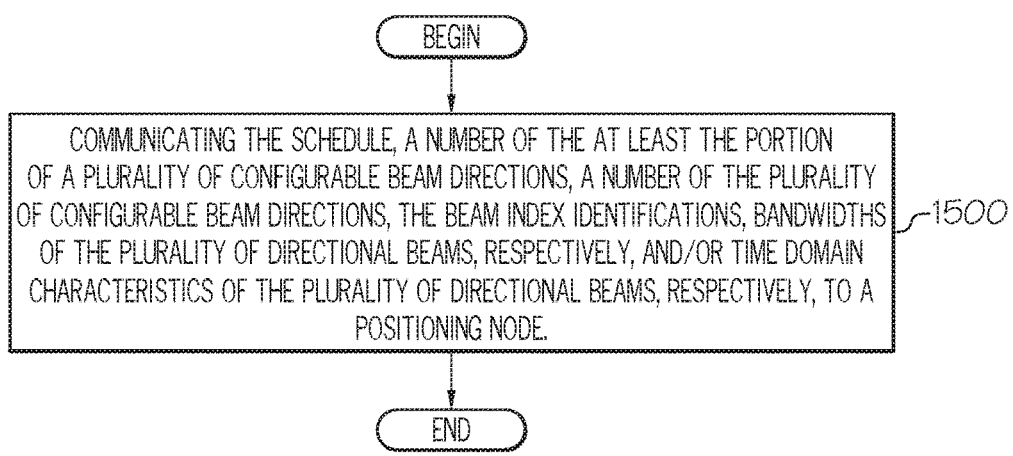

The base stations gNB1 105a, gNB2, 105b, gNB3 105c, gNB4 105d and/or gNB5 105e may communicate the particular beam configuration information to the positioning node 120 for communication to the UEs 110a,b,c to facilitate reception of the PRS signals at the UEs 110a,b,c. Referring to FIG. 15, the base stations gNB1 105a, gNB2, 105b, gNB3 105c, gNB4 105d and/or gNB5 105e may communicate the PRS transmission schedule along with the beam configuration including, but not limited to, information identifying a number of the at least the portion of a plurality of configurable beam directions (i.e., the beams in operation), a number of the plurality of configurable beam directions (i.e., the maximum number of configurable beams), the beam index identifications, bandwidths of the plurality of directional beams, respectively, and/or time domain characteristics of the plurality of directional beams, respectively, to the positioning node (block 1500).

Figure 16:
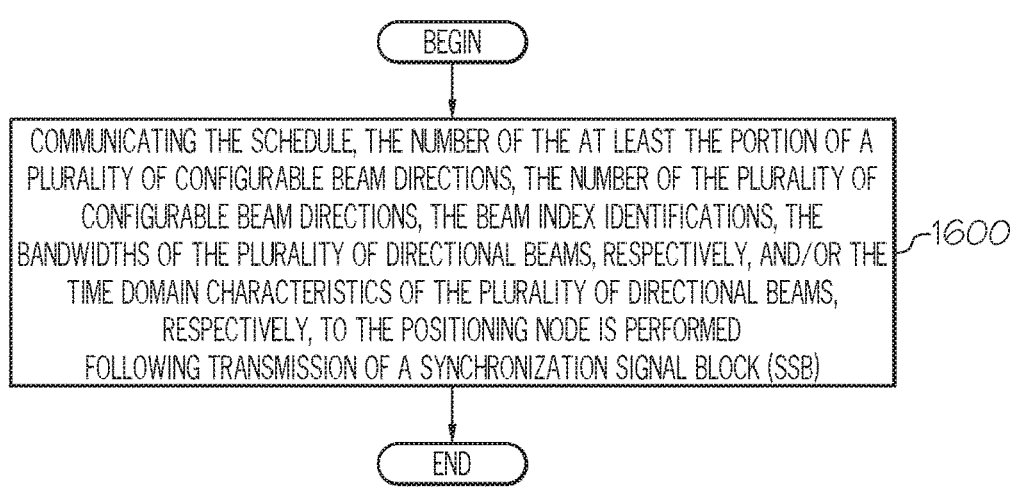

Referring to FIG. 16, In still other embodiments, communicating the PRS transmission schedule along with the beam configuration including, but not limited to, information identifying a number of the at least the portion of a plurality of configurable beam directions (i.e., the beams in operation), a number of the plurality of configurable beam directions (i.e., the maximum number of configurable beams), the beam index identifications, bandwidths of the plurality of directional beams, respectively, and/or time domain characteristics of the plurality of directional beams, respectively, to the positioning node 120 is performed following transmission of a Synchronization Signal Block (SSB) (block 1600).

Figure 17:
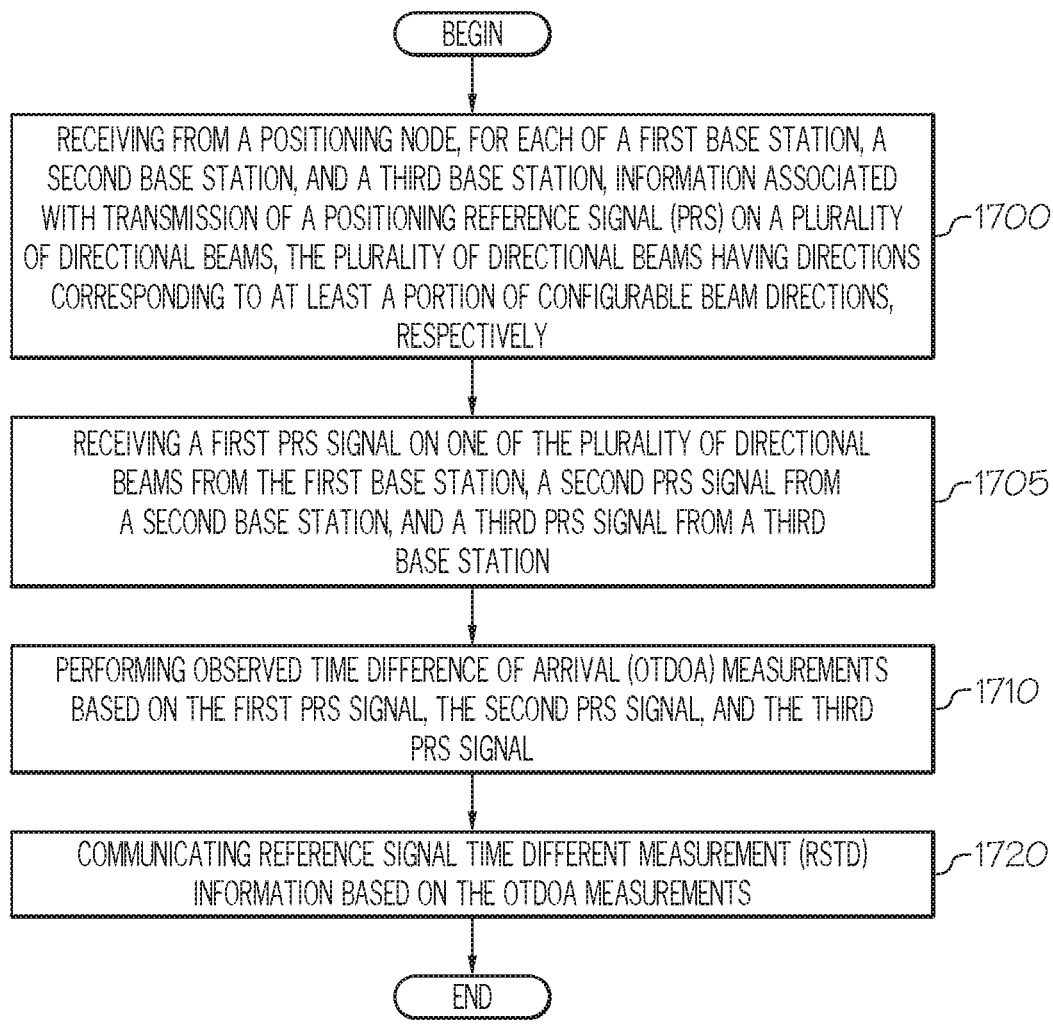

Referring to FIG. 17, operations of a UE, such as one or more of the UEs 110a,b,c of FIG. 1, for facilitating positioning estimation may comprise receiving from the positioning node 120 for each of a one of the base stations, second, and third one of the base stations gNB1 105a, gNB2, 105b, gNB3 105c, gNB4 105d or gNB5 105e information associated with transmission of a PRS on a plurality of directional beams. The plurality of directional beams having directions corresponding to at least a portion of a plurality of configurable beam directions, respectively (block 1700). A first PRS signal is received on one of the plurality of directional beams from the first base station gNB1 105a, gNB2, 105b, gNB3 105c, gNB4 105d or gNB5 105e, a second PRS signal from a second base station gNB1 105a, gNB2, 105b, gNB3 105c, gNB4 105d or gNB5 105e, and a third PRS signal from a third base station gNB1 105a, gNB2, 105b, gNB3 105c, gNB4 105d or gNB5 105e (block 1705). Although the example embodiments are described with respect to three base stations, the inventive concepts may be applied to a different number of base stations. In some embodiments, three base stations may be a minimum number of base stations for facilitating position estimation as described herein, OTDOA measurement taking is performed based on the first PRS signal, the second PRS signal, and the third PRS signal (block 1710). RSTD information is communicated, for example, to the positioning node 120, based on the OTDOA measurements (block 1720). Thus, a UE 110a,b,c may take OTDOA measurements, such as RSTD information, during a measurement time interval where the UE 110a,b,c receives directional beams from at least three base stations gNB1 105a, gNB2, 105b, gNB3 105c, gNB4 105d and/or gNB5 105e, which are configured to transmit a plurality of different directional beams, where one of the beams from one of the base stations gNB1 105a, gNB2, 105b, gNB3 105c, gNB4 105d and/or gNB5 105e is used as a reference and the other beams are used to determine time of arrival differences relative to the beam from the reference base station gNB1 105a, gNB2, 105b, gNB3 105c, gNB4 105d and/or gNB5 105e.

Figure 18:
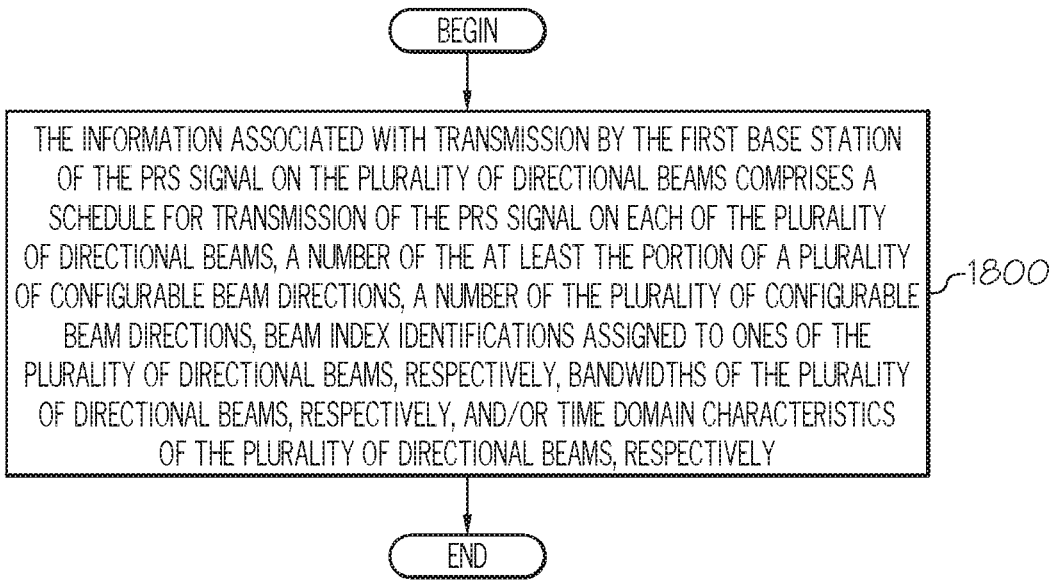

Referring to FIG. 18, the information received from the positioning node 120 may comprise the PRS transmission schedule along with the beam configuration information for one or more of the base stations gNB1 105a, gNB2, 105b, gNB3 105c, gNB4 105d and/or gNB5 105e including, but not limited to, information identifying a number of the at least the portion of a plurality of configurable beam directions (i.e., the beams in operation), a number of the plurality of configurable beam directions (i.e., the maximum number of configurable beams), the beam index identifications, bandwidths of the plurality of directional beams, respectively, and/or time domain characteristics of the plurality of directional beams, respectively (block 1800).

Figure 19:
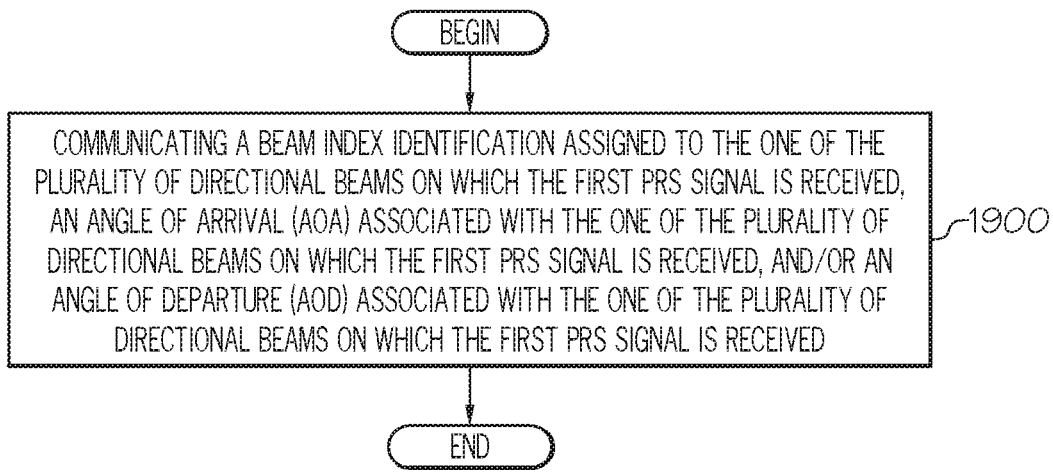

Referring to FIG. 19, the UE 110a,b,c may, in response, for example, to a location information request from the positioning node 120, communicate a beam index identification assigned to the one of the plurality of directional beams on which the first PRS signal is received, an AoA associated with the one of the plurality of directional beams on which the first PRS signal is received, and/or an Angle of Departure AoD associated with the one of the plurality of directional beams on which the first PRS signal is received (block 1900). In other embodiments, the UE 110a,b,c may communicate beam index information, AoA information, and/or AoD information for all beams involved in the OTDOA/RSTD measurements to the positioning node 120. Cell identification information associated with the beams used in the OTDOA/RSTD measurements may also be communicated to the positioning node 120.

Figure 20:
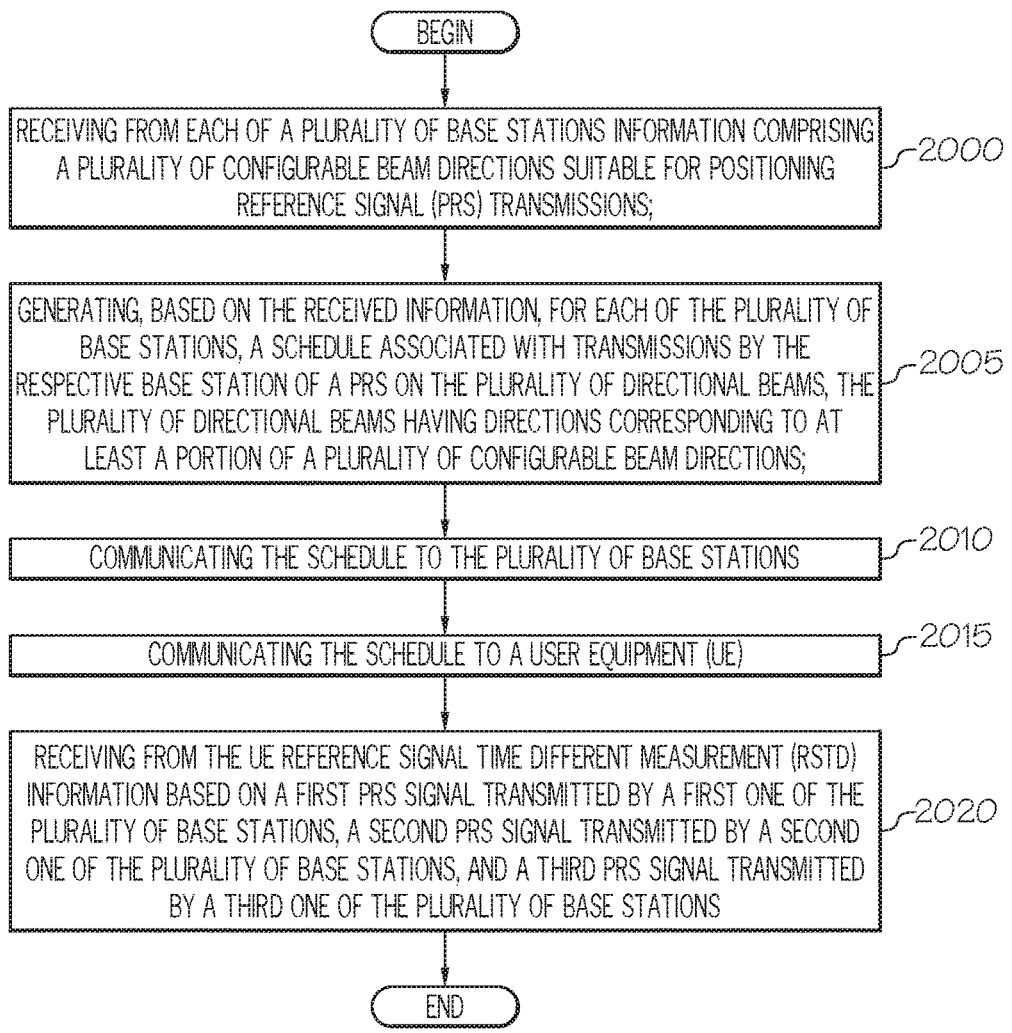

Referring to FIG. 20, operations of the positioning node 120 of FIG. 1, such as an LS or SMLC, for facilitating positioning estimation may comprise receiving from each of a plurality of base stations gNB1 105a, gNB2, 105b, gNB3 105c, gNB4 105d or gNB5 105e information comprising a plurality of configurable beam directions suitable for Positioning Reference Signal (PRS) transmissions (block 2000). Based on the received information, a schedule is generated for each of the plurality of base stations gNB1 105a, gNB2, 105b, gNB3 105c, gNB4 105d or gNB5 105e. The schedule may be associated with transmissions by the respective base station of a PRS on the plurality of directional beams. The plurality of directional beams may have directions corresponding to at least a portion of a plurality of configurable beam directions (block 2005). The schedule may be communicated to the plurality of base stations gNB1 105a, gNB2, 105b, gNB3 105c, gNB4 105d or gNB5 105e (block 2010) and to a UE 110a,b,c (block 2015). The positioning node may receive from the UE 120 RSTD information based on a first PRS signal transmitted by a first one of the plurality of base stations, a second PRS signal transmitted by a second one of the plurality of base stations, and a third PRS signal transmitted by a third one of the plurality of base stations (block 2015).

Figure 21:
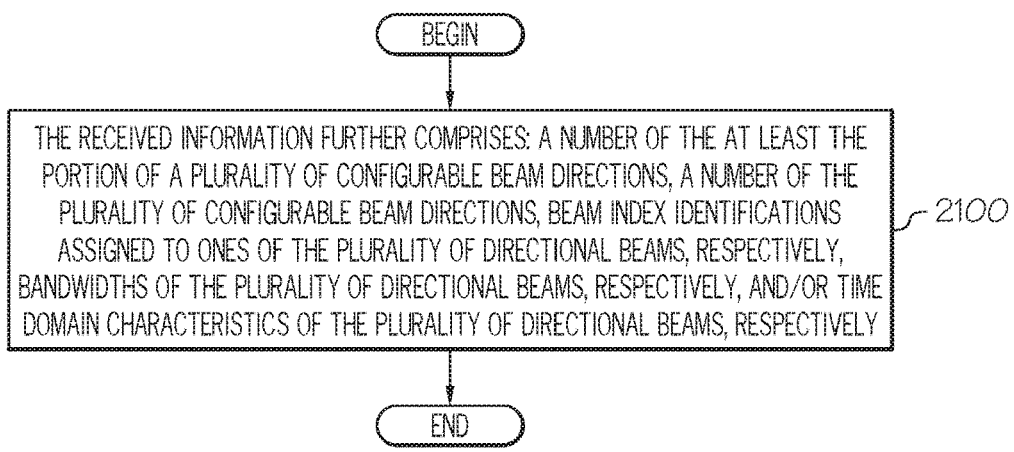

Referring to FIG. 21, the information received from one or more base stations, such as the first base station gNB1 105a, gNB2, 105b, gNB3 105c, gNB4 105d or gNB5 105e, may further comprise the beam configuration information for the each of the various base stations gNB1 105a, gNB2, 105b, gNB3 105c, gNB4 105d or gNB5 105e including, but not limited to, information identifying a number of the at least the portion of a plurality of configurable beam directions (i.e., the beams in operation), a number of the plurality of configurable beam directions (i.e., the maximum number of configurable beams), the beam index identifications, bandwidths of the plurality of directional beams, respectively, and/or time domain characteristics of the plurality of directional beams, respectively (block 2100).

Figure 22:
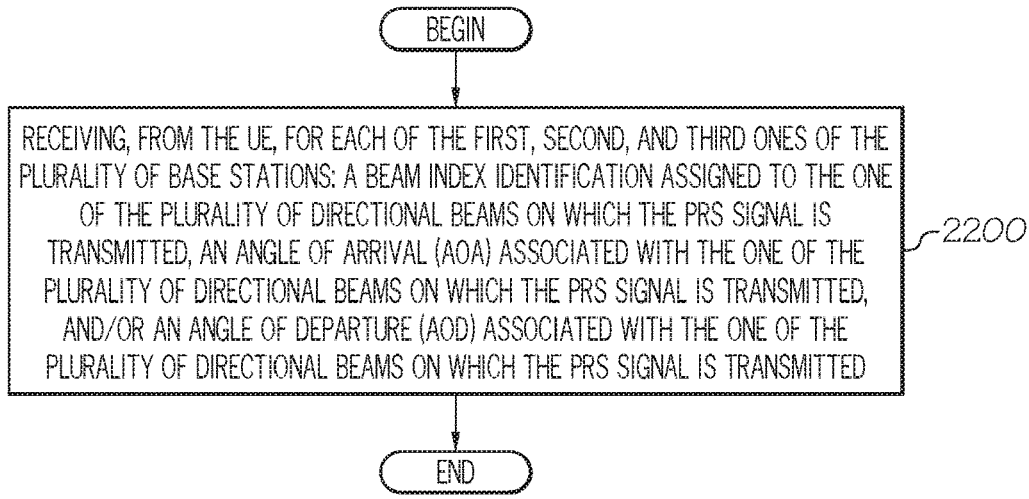

Referring to FIG. 22, the positioning node 120 may send a location information request to a UE 110a,b,c and may receive, in response thereto, for each of the first, second, and third ones of the plurality of base stations gNB1 105a, gNB2, 105b, gNB3 105c, gNB4 105d or gNB5 105e referred to in block 2020 of FIG. 20, a beam index identification assigned to the one of the plurality of directional beams on which the PRS signal is transmitted, an AoA associated with the one of the plurality of directional beams on which the PRS signal is transmitted, and/or an AoD associated with the one of the plurality of directional beams on which the PRS signal is transmitted (block 2200). Cell identification information associated with the beams used in the OTDOA/RSTD measurements may also be received from the UE 110a,b,c.

Figure 23:
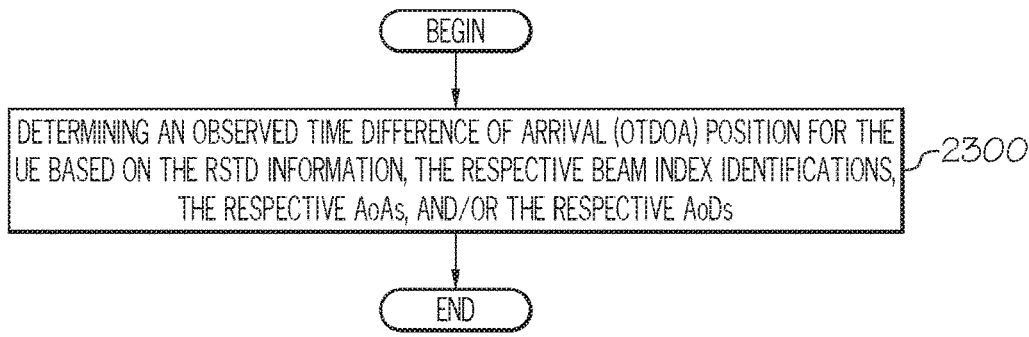

Referring to FIG. 23, the positioning node 120 may determine an OTDOA position for the UE 110a,b,c based on the RSTD information, the AoA information and/or the AoD information (block 2300).

Figure 24:
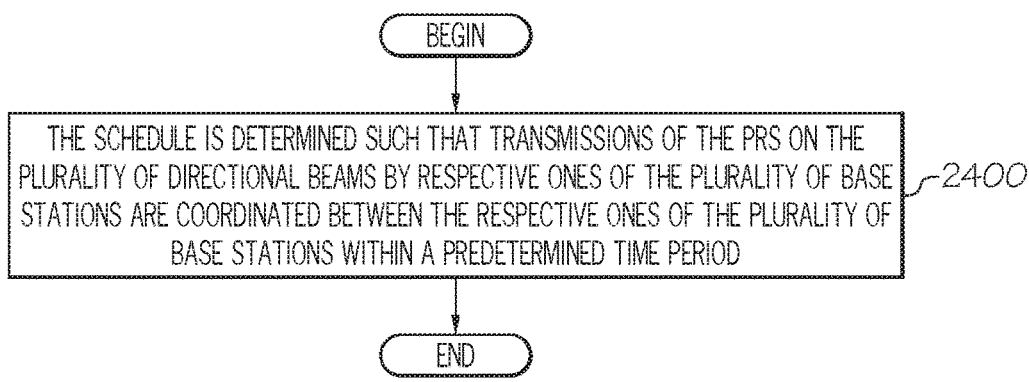

Referring to FIG. 24, the PRS transmission schedule along with the selection of which beams to configure may be coordinated among various base stations gNB1 105a, gNB2, 105*b*, gNB3 105*c*, gNB4 105*d* and gNB5 105*e* to ensure that a UE 110*a,b,c* can receive a sufficient number of PRS transmissions from different base stations to perform the TOA measurements used in the OTDOA methodology. For example, the schedule may be determined using the positioning node 120 such that transmissions of the PRS on the plurality of directional beams by respective ones of the plurality of base stations are coordinated between the respective ones of the plurality of base stations within a predetermined time period (block 2400).

Figure 25:
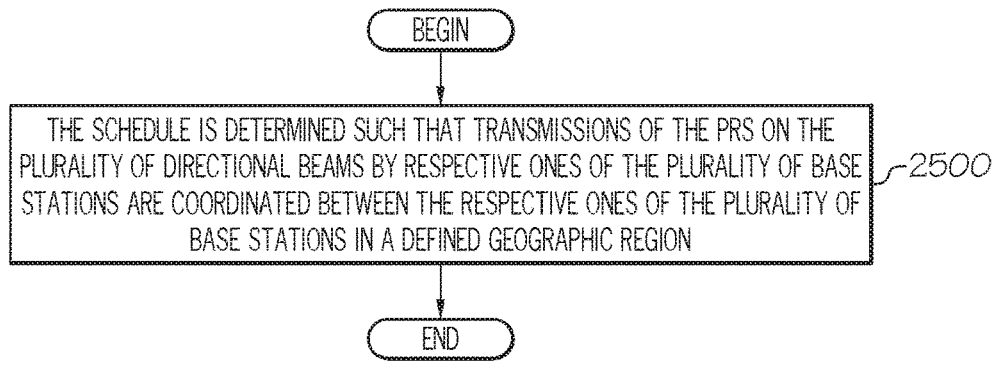

In some embodiments, all PRS transmissions from the various base stations gNB1 105*a*, gNB2, 105*b*, gNB3 105*e*, gNB4 105*d* and gNB5 105*e* transmitted within a predetermined geographic area may be scheduled to occur within a specified time period, e.g., 0.5 ms. Thus, referring to FIG. 25, the schedule may be determined using the positioning node 120 such that transmissions of the PRS on the plurality of directional beams by respective ones of the plurality of base stations are coordinated between the respective ones of the plurality of base stations in a defined geographic region (block 2500)

Figure 26:
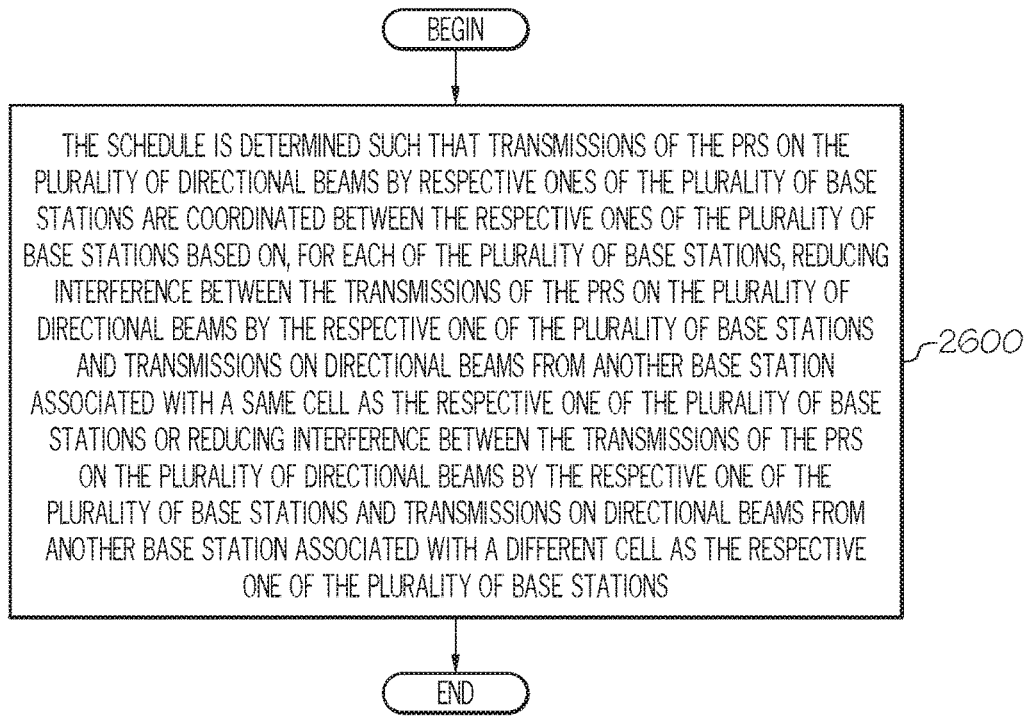

Another criterion used in scheduling the PRS transmissions among the various base stations gNB1 105*a*, gNB2, 105*b*, gNB3 105*c*, gNB4 105*d* and gNB5 105*e* is to minimize or reduce interference between a base station performing a PRS transmission and one or more other base stations performing beam transmissions (PRS or otherwise) either within a serving cell or a neighbor cell. Thus, referring to FIG. 26, the schedule may be determined using the positioning node 120 such that transmissions of the PRS on the plurality of directional beams by respective ones of the plurality of base stations are coordinated between the respective ones of the plurality of base stations based on, for each of the plurality of base stations, reducing interference between the transmissions of the PRS on the plurality of directional beams by the respective one of the plurality of base stations and transmissions on directional beams from another base station associated with a serving cell of the plurality of base stations or reducing interference between the transmissions of the PRS on the plurality of directional beams by the respective one of the plurality of base stations and transmissions on directional beams from another base station associated with a neighbor cell as the respective one of the plurality of base stations (block 2600).

Figure 27:
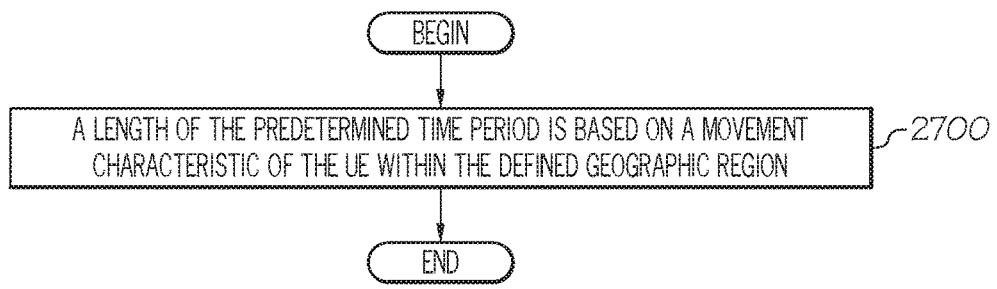

In some embodiments, the PRS transmissions from the various base stations within a predetermined geographic area may be coordinated to ensure that the time period with which a sufficient number of PRS transmissions are available to a UE is based on a movement characteristic of the UE. Thus, referring to FIG. 27, a length of the predetermined time period may be based on a movement characteristic of a UE 110*a,b,c* within the defined geographic region (block 2700).

Figure 28:
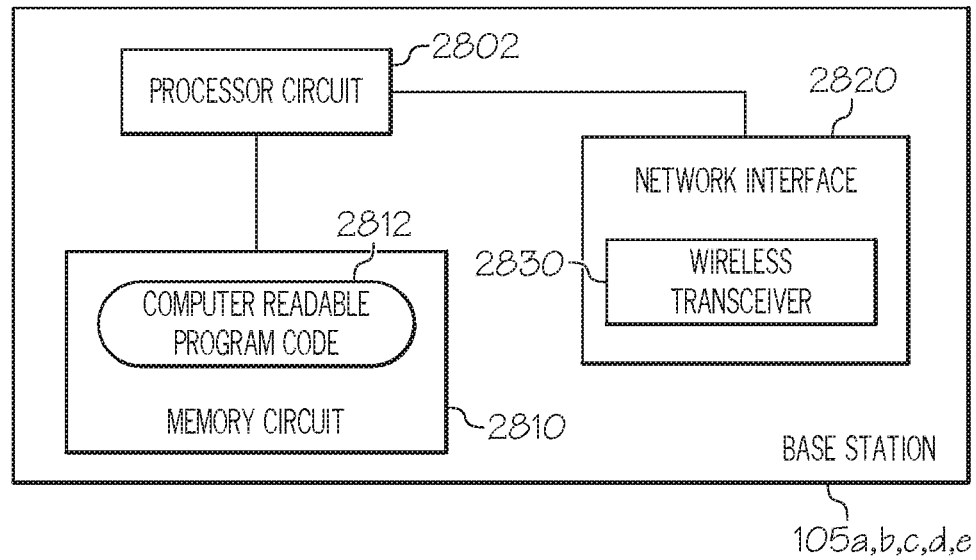
FIG. 28 is a block diagram that illustrates a base station according to some embodiments of the inventive concept.

FIG. 28 is a block diagram that illustrates a base station 105*a,b,c,d,e* that is configured to perform operations according to one or more embodiments described herein. The base station 105*a,b,c,d,e* comprises a processor circuit 2802, a memory circuit 2810, and a network interface 2820. The network interface 2820 comprises a wireless transceiver 2830 configured to implement wireless communication protocols including, but not limited to, those supported by 5G NR wireless communication networks. The processor circuit 2802 may comprise one or more data processing circuits, such as a general purpose and/or special purpose processor, e.g., microprocessor and/or digital signal processor. The processor circuit 2802 is configured to execute the computer readable program code 2812 in the memory circuit 2810 to perform at least some of the operations described herein as being performed by a base station 105*a,b,c,d,e*.

Figure 29:
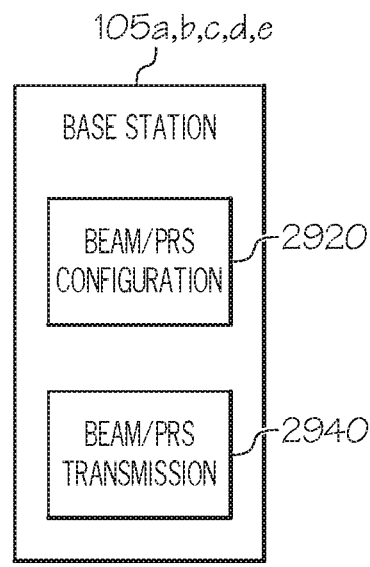
FIG. 29 is a block diagram that illustrates functional modules in a base station according to some embodiments of the inventive concept.

FIG. 29 is a block diagram that illustrates functional modules in a base station 105*a,b,c,d,e* according to some embodiments of the inventive concept. The base station 105*a,b,c,d,e* comprises a beam configuration/PRS scheduling module 2920,which is configured to perform the various multibeam configuration operations and/or PRS scheduling operations, in cooperation with the positioning node 120, described herein and a Beam/PRS transmission module 2940, which is configured to perform PRS transmissions on the various operational beams to perform a beam sweep as described herein.

Figure 30:
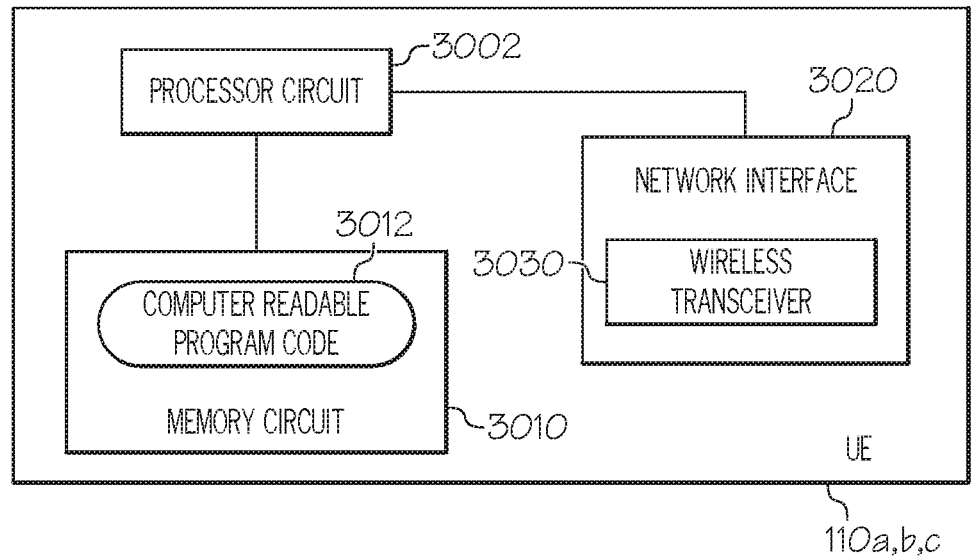
FIG. 30 is a block diagram that illustrates a UE according to some embodiments of the inventive concept.

FIG. 30 is a block diagram that illustrates a UE 110*a,b,c* that is configured to perform operations according to one or more embodiments described herein. The UE 110*a,b,c* comprises a processor circuit 3002, a memory circuit 3010, and a network interface 3020. The network interface 3020 comprises a wireless transceiver 3030 configured to implement wireless communication protocols including, but not limited to, those supported by 5G NR wireless communication networks. The processor circuit 3002 may comprise one or more data processing circuits, such as a general purpose and/or special purpose processor, e.g., microprocessor and/or digital signal processor. The processor circuit 3002 is configured to execute the computer readable program code 3012 in the memory circuit 3010 to perform at least some of the operations described herein as being performed by a UE 110*a,b,c*.

Figure 31:
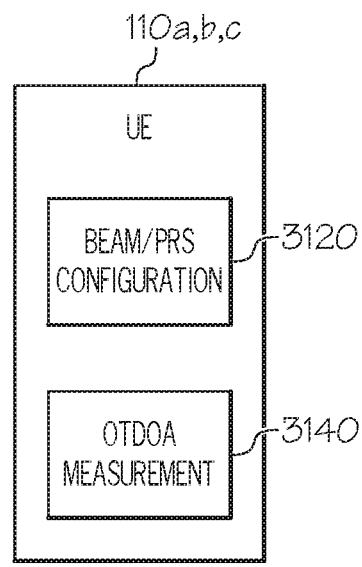
FIG. 31 is a block diagram that illustrates functional modules in a UE according to some embodiments of the inventive concept.

FIG. 31 is a block diagram that illustrates functional modules in a UE 110*a,b,c* according to some embodiments of the inventive concept. The UE 110*a,b,c* comprises a beam configuration/PRS scheduling module 3120, which is configured to receive the beam configuration information from the positioning node 120 for the various base stations 105*a,b,c,d,e* and using that information to detect the transmission of PRS signals from beams transmitted from different base stations 105*a,b,c,d,e*. The UE 110*a,b,c* further comprises an OTDOA measurement module 3140 that is configured to perform OTDOA measurements, such as RSTD information as well as to determine AoA, AoD, and/or beam index information for the various PRSs received on different beams and to report a portion or all of this information, including, for example cell identification information, to the positioning node 120 as described herein.

Figure 32:
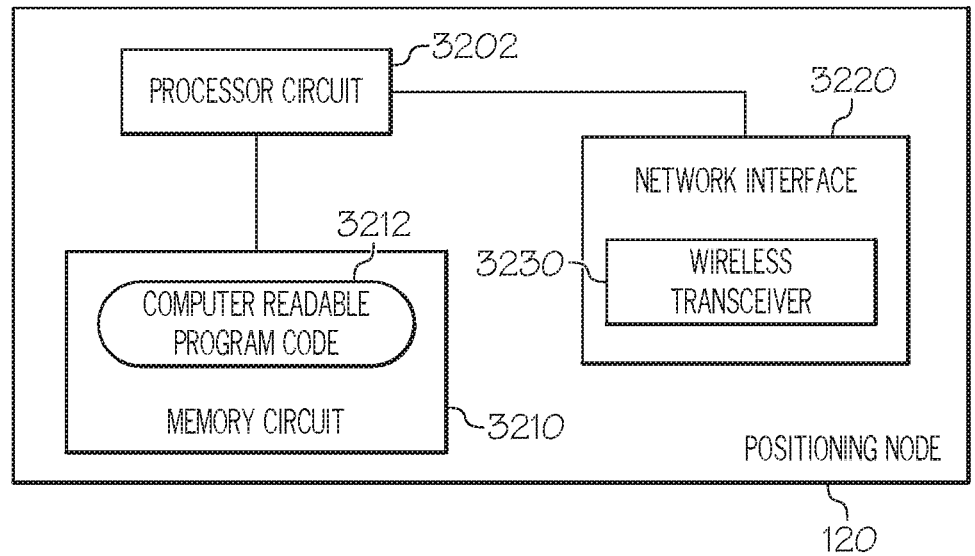
FIG. 32 is a block diagram that illustrates a positioning node according to some embodiments of the inventive concept.

FIG. 32 is a block diagram that illustrates a positioning node 120 that is configured to perform operations according to one or more embodiments described herein. The positioning node 120 comprises a processor circuit 3202, a memory circuit 3210, and a network interface 3220. The network interface 3220 comprises a wireless transceiver 3230 configured to implement wireless communication protocols including, but not limited to, those supported by 5G NR wireless communication networks. In other embodiments, the network interface 3220 may include a wireline interface for communicating with, for example, base stations 105*a,b,c,d,e* over one or more networks that may comprise wireless and/or wireline networks. The processor circuit 3202 may comprise one or more data processing circuits, such as a general purpose and/or special purpose processor, e.g., microprocessor and/or digital signal processor. The processor circuit 3202 is configured to execute the computer readable program code 3212 in the memory circuit 3210 to perform at least some of the operations described herein as being performed by a positioning node 120.

Figure 33:
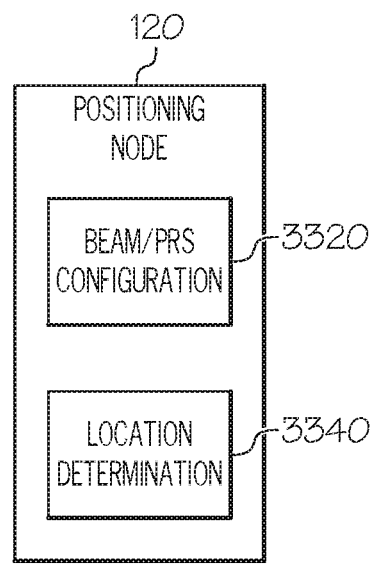
FIG. 33 is a block diagram that illustrates functional modules in a positioning node according to some embodiments of the inventive concept.

FIG. 33 is a block diagram that illustrates functional modules in a positioning node 120 according to some embodiments of the inventive concept. The positioning node 120 comprises a beam configuration/PRS scheduling module 3320, which is configured to receive beam configuration information from the base stations 105a,b,c,d,e and to determine PRS scheduling information for coordinating PRS transmissions among the various base stations 105a,b,c,d,e. The beam configuration information and/or the PRS transmission scheduling information may be provided to the UEs 110a,b,c. The positioning node 120 further comprises a location determination module 3340, which is configured to perform an OTDOA location determination for a UE 110a,b,c based on RSTD information as well as, in some embodiments, AoA, AoD, and/or beam index information for the various PRSs. New studies have been approved to evaluate potential solutions to address NR positioning requirements as defined in TR 38.913, TS 22.261, TR 22.872 and TR 22.804 while considering E911 requirements by analyzing positioning accuracy (including latitude, longitude and altitude), availability, reliability, latency, network synchronization requirements and/or UE/gNB complexity to perform positioning, and taking into account a preference to improve synergy where possible with existing positioning support for E-UTRAN.

A second objective of the NR positioning support study includes the following:

Study and evaluate potential solutions of positioning technologies based on the above identified requirements, evaluation scenarios/methodologies. The solutions may include at least NR-based Radio Access Technology (RAT) dependent positioning to operate in both FR1 and FR2 whereas other positioning technologies are not precluded; and minimum bandwidth target (e.g. 5 MHz) of NR with scalability may be supported towards general extension for any applications.

OTDOA techniques, according to some embodiments, may be used as a one of the potential solutions of positioning technologies in NR.

OTDOA is a RAT dependent positioning technique that has been widely deployed in LTE networks. In the basic operation in LTE, a user equipment (UE) receives reference signals from multiple eNBs and then performs timing difference of arrival (TDOA) measurements for each eNB and then calculates a Reference Signal Time Difference (RSTD). The RSTD measurement results are transmitted using the LTE Positioning Protocol (LPP) from the UE to a location server (LS) via an eNode-B. The LS then performs the positioning estimation based on measurement results from at least three eNode-B facilities using triangulation.

OTDOA is a mature positioning technique and it has extensively been used in LTE as one of the key RAT dependent techniques.

Considering the maturity of OTDOA technique and the adoption in LTE, OTDOA use in LTE may serve as the baseline for OTDOA in NR. In LTE, PRS is one of the reference signals that is used to facilitate a UE positioning determination based on the OTDOA method. PRS has the following properties:

PRS Generation:

PRS may be generated based on a specific sequence generation as defined in TS 36.211. It is based on a length-31 gold sequence. The PRS sequence may depend on the cell-id and frame/slot timing information.

Resource Element Mapping:

The PRS may be mapped to complex-valued QPSK modulation symbol and the mapping of a PRS signal to resource elements are defined according to TS 36.211.

PRS Scheduling:

PRSs may be transmitted in dedicated sub-frames (known as PRS occasion) and it may consist of several subframes. For example, the PRS occasion periodicities may be 160, 320, 640, and 1280 ms. The number of PRS subframes within a PRS occasion can be 1, 2, 4, and 6 subframes.

There may be many other PRS properties that have been considered in LTE, such as PRS muting, network synchronization, etc. For use of the OTDOA technique in NR positioning, the aforementioned PRS properties in LTE may be revisited to determine whether to completely re-use or modify them for potential positioning improvements.

OTDOA in LTE may be used as the baseline for OTDOA in NR according to some embodiments. PRS design in LTE (e.g. sequence, resource element mapping, scheduling) may be revisited for potential improvements.

NR rel.15 has many new physical layer features in comparison to LTE. NR can accommodate wider bandwidth and operates in various frequency ranges. In sub 6 GHz (FR1), the maximum bandwidth is 100 MHz, and in millimeter wave range (FR2) the maximum bandwidth is 400 MHz. The carrier aggregation operation can further extend the bandwidth. In FR2, operations with multiple beams (facilitated by MIMO antenna scheme) may be used in some embodiments. Each beam may have a narrow beam with high gain. For example, the existing NR rel.15 can accommodate up to 64 beams for the synchronization signal block (SSB) transmission. Considering there are many significant changes in NR, NR features may be exploited, according to some embodiments, for potential OTDOA positioning improvements.

NR features (e.g. wider bandwidth, MIMO, multibeam operation, densify network) may be exploited for potential OTDOA positioning improvements in some embodiments.

In LTE, the PRS may be transmitted by the eNB under the assumption that the eNB has an omni-directional/sector antenna. There is typically no indication of the beam aspect of the antenna being used in transmitting the PRS. Similarly, the UE is expected to use an omni-directional or relatively wide antenna for receiving the beam carrying the PRS. As indicated above, particularly in NR FR2, an operation of one or multiple narrow beams may be used to compensate for path loss in millimeter wave frequency. As a result, PRS transmission in LTE may not be fully adopted in NR. A proper scheduling mechanism to accommodate PRS transmission on those multiple beams may be determined in accordance with some embodiments.

OTDOA techniques in millimeter wave frequency range (FR2) may be studied to evaluate the effect on multibeam operation.

NR positioning requirements may be developed for for numerous use-cases/scenarios. Multiple dimensions of performance metrics may be defined according to some embodiments (horizontal accuracy, vertical accuracy, availability, latency, etc.) and various requirement levels (sub-1 m, 10 m, 50 m, etc.).

NR positioning may support various use-cases, which have multiple dimensions of performance metric (e.g. on horizontal accuracy, vertical accuracy, availability, and latency) and requirements level (e.g tens of meter, sub 1 meter) according to some embodiments.

It may be difficult to identify one technical solution that fits to all use-cases and scenarios. In OTDOA, an accurate positioning typically requires wide bandwidth and many PRS subframes. Many PRS subframes may increase the latency. Yet, some use-cases may require high accuracy and short latency. Generally, the majority of use-cases does not require high accuracy and only require reasonable latency.

Based on the above observation, a flexible operation on positioning techniques may be beneficial. It can be a flexible operation by means of combining RAT dependent and RAT independent techniques according to some embodiments. Another consideration is a flexible operation in OTDOA positioning itself.

Flexible operation of OTDOA positioning may be considered to meet demanding positioning requirements (e.g. accuracy and latency) for a few use-cases and to meet relaxed requirements for many use-cases.

According to some embodiments of the inventive concept, a method of operating a base station includes determining a schedule associated with transmission by the base station of a Positioning Reference Signal (PRS) on a plurality of directional beams, the plurality of directional beams having directions corresponding to at least a portion of a plurality of configurable beam directions, the schedule being based on a coordination of the PRS transmission by the base station with PRS transmission on directional beams from at least one other base station; and transmitting the PRS on each of the plurality of directional beams based on the determined schedule.

In other embodiments, the base station is a first base station, wherein the at least one other base station comprises a second base station, and wherein the schedule for the transmission of the PRS on each of the plurality of directional beams is determined by coordinating the PRS transmissions from the first base station with PRS transmissions scheduled to be transmitted on directional beams from the second base station such that the PRS transmissions from the first base station and the PRS transmissions from the second base station occur within a predetermined time period.

In still other embodiments, the schedule for the transmission of the PRS on each of the plurality of directional beams is determined such that the PRS transmissions transmitted from the first base station are coordinated with the PRS transmissions scheduled to be transmitted on the directional beams from the second base station in a defined geographic region.

In still other embodiments, the schedule for the transmission of the PRS on each of the plurality of directional beams is determined such that the PRS transmissions transmitted from the first base station are coordinated with the PRS transmissions scheduled to be transmitted on the directional beams from the second base station based on reducing interference between the PRS transmissions transmitted from the first base station and PRS transmissions transmitted from the second base station through multiplexing of first resources associated with the PRS transmissions transmitted from the first base station and second resources associated with PRS transmissions transmitted from the second base station.

In still other embodiments, the first resources comprise first sub-frequencies and first time segments and the second resources comprise second sub-frequencies and second time segments.

In still other embodiments, a length of the predetermined time period is based on a movement characteristic of a User Equipment (UE) within the defined geographic region (800).

In still other embodiments, determining the schedule for the transmission of the PRS on each of the plurality of directional beams comprises generating the schedule for the transmission of the PRS on each of the plurality of directional beams so as to complete the transmission of the PRS on each of the plurality of beams within a PRS burst interval.

In still other embodiments, the PRS burst interval is a first one of a plurality of PRS burst intervals. The method further comprises generating the schedule for the transmission of the PRS on each of the plurality of directional beams so as to complete the transmission of the PRS on each of the plurality of beams within each of the plurality PRS burst intervals.

In still other embodiments, respective ones of the plurality of PRS burst intervals are scheduled to occur on a periodic basis.

In still other embodiments, respective ones of the plurality of PRS burst intervals are scheduled to occur consecutively.

In still other embodiments, the method further comprises assigning beam index identifications to the plurality of directional beams, respectively. The schedule is based on the beam index identifications.

In still other embodiments, communicating the schedule, a number of the at least the portion of a plurality of configurable beam directions, a number of the plurality of configurable beam directions, the beam index identifications, bandwidths of the plurality of directional beams, respectively, or time domain characteristics of the plurality of directional beams, respectively, to a positioning node.

In still other embodiments, communicating the schedule, the number of the at least the portion of a plurality of configurable beam directions, the number of the plurality of configurable beam directions, the beam index identifications, the bandwidths of the plurality of directional beams, respectively, or the time domain characteristics of the plurality of directional beams, respectively, to the positioning node is performed following transmission of a Synchronization Signal Block (SSB).

In still other embodiments, the schedule is a resource allocation schedule that identifies time segments and sub-frequencies used for transmission by the base station of the PRS on the plurality of directional beams. The method further comprises assigning beam index identifications to the plurality of directional beams, respectively, the beam index identifications corresponding to pairs of time segment and sub-frequency identifications, respectively. The resource allocation schedule is based on the beam index identifications.

In some embodiments of the inventive concept, a method of operating a User Equipment (UE) comprises receiving from a positioning node, for each of a first base station and a second base station, information associated with transmission of a Positioning Reference Signal (PRS) on a plurality of directional beams, the information comprising a schedule that is based on a coordination of the PRS transmissions on the plurality of directional beams by the first base station and the second base station, and the plurality of directional beams having directions corresponding to at least a portion of a plurality of configurable beam directions, respectively; and receiving a first PRS signal on a first one of the plurality of directional beams from the first base station and a second PRS signal from a second one of the plurality of directional beams second base station based on the schedule, which is based on the coordination of the PRS transmissions.

In further embodiments, the method further comprises performing Observed Time Difference of Arrival (OTDOA) measurements based on the first PRS signal, the second PRS signal, and a third PRS signal received from a third base station; and communicating Reference Signal Time Different Measurement (RSTD) information based on the OTDOA measurements.

In still further embodiments, the information associated with transmission by the first base station of the PRS signal on the plurality of directional beams comprises a number of the at least the portion of a plurality of configurable beam directions, a number of the plurality of configurable beam directions, beam index identifications assigned to ones of the plurality of directional beams, respectively, bandwidths of the plurality of directional beams, respectively, or time domain characteristics of the plurality of directional beams, respectively.

In still further embodiments, the method further comprises communicating (1900), to a positioning node, a beam index identification assigned to the one of the plurality of directional beams on which the first PRS signal is received, an Angle of Arrival (AoA) associated with the one of the plurality of directional beams on which the first PRS signal is received, or an Angle of Departure (AoD) associated with the one of the plurality of directional beams on which the first PRS signal is received.

In still further embodiments, the schedule is a resource allocation schedule that identifies time segments and sub-frequencies used for PRS transmissions by the first base station and the second base station on the plurality of directional beams; and the beam index identifications correspond to pairs of the time segment and the sub-frequency identifications, respectively.

In some embodiments of the inventive concept, a method of operating a positioning node comprises receiving from each of a plurality of base stations information comprising a plurality of configurable beam directions suitable for Positioning Reference Signal (PRS) transmissions; communicating, for each of the plurality of base stations, a schedule associated with transmissions by the respective base station of a PRS on the plurality of directional beams to a User Equipment (UE), the schedule being based on a coordination of the PRS transmissions on the plurality of directional beams by the plurality of base stations; and receiving from the UE Reference Signal Time Different Measurement (RSTD) information based on a first PRS signal transmitted by a first one of the plurality of base stations, a second PRS signal transmitted by a second one of the plurality of base stations, and a third PRS signal transmitted by a third one of the plurality of base stations.

In other embodiments of the inventive concept, the method further comprises communicating, by the positioning node, the schedule to the plurality of base stations, prior to communication of the schedule to the UE. The schedule is generated by the positioning node based on the information received from the plurality of base stations, and the plurality of directional beams have directions corresponding to at least a portion of a plurality of configurable beam directions.

In still other embodiments of the inventive concept, the received information further comprises: a number of the at least the portion of a plurality of configurable beam directions, a number of the plurality of configurable beam directions, beam index identifications assigned to ones of the plurality of directional beams, respectively, bandwidths of the plurality of directional beams, respectively, or time domain characteristics of the plurality of directional beams, respectively.

In still other embodiments of the inventive concept, the method further comprises receiving, from the UE, for each of the first, second, and third ones of the plurality of base stations: a beam index identification assigned to the one of the plurality of directional beams on which the PRS signal is transmitted, an Angle of Arrival (AoA) associated with the one of the plurality of directional beams on which the PRS signal is transmitted, or an Angle of Departure (AoD) associated with the one of the plurality of directional beams on which the PRS signal is transmitted.

In still other embodiments of the inventive concept, the method further comprises determining an Observed Time Difference of Arrival (OTDOA) position for the UE based on the RSTD information, the respective beam index identifications, the respective AoAs, or the respective AoDs.

In still other embodiments of the inventive concept, the schedule is determined such that transmissions of the PRS on the plurality of directional beams by respective ones of the plurality of base stations are coordinated between the respective ones of the plurality of base stations so as to occur within a predetermined time period.

In still other embodiments of the inventive concept, the schedule is determined such that transmissions of the PRS on the plurality of directional beams by respective ones of the plurality of base stations are coordinated between the respective ones of the plurality of base stations in a defined geographic region.

In still other embodiments of the inventive concept, the schedule is determined such that transmissions of the PRS on the plurality of directional beams by respective ones of the plurality of base stations are coordinated between the respective ones of the plurality of base stations based on, for each of the plurality of base stations, reducing interference between the transmissions of the PRS on the plurality of directional beams by the respective one of the plurality of base stations and transmissions on another respective one of the plurality of base stations through multiplexing of first resources associated with the PRS transmissions transmitted from the respective one of the plurality of base stations and second resources associated with the PRS transmissions transmitted from the other respective one of the plurality of base stations.

In still other embodiments of the inventive concept, the schedule is a resource allocation schedule that identifies time segments and sub-frequencies used for transmission by the respective base stations of the PRS on the plurality of directional beams. The beam index identifications correspond to pairs of the time segment and the sub-frequency identifications, respectively.

In some embodiments of the inventive concept, a base station comprises a processor; and a memory coupled to the processor and comprising computer readable program code embodied in the memory that is executable by the processor to perform operations comprising: determining a schedule associated with transmission by the base station of a Positioning Reference Signal (PRS) on a plurality of directional beams, the plurality of directional beams having directions corresponding to at least a portion of a plurality of configurable beam directions, the schedule being based on a coordination of the PRS transmission by the base station with PRS transmission on directional beams from at least one other base station; and transmitting the PRS on each of the plurality of directional beams based on the determined schedule.

In some embodiments of the inventive concept, a User Equipment (UE) device comprises a processor; and a memory coupled to the processor and comprising computer readable program code embodied in the memory that is executable by the processor to perform operations comprising: receiving from a positioning node, for each of a first base station and a second base station, information associated with transmission of a Positioning Reference Signal (PRS) on a plurality of directional beams, the information comprising a schedule that is based on a coordination of the PRS transmissions on the plurality of directional beams by the first base station and the second base station, and the plurality of directional beams having directions corresponding to at least a portion of a plurality of configurable beam directions, respectively; and receiving a first PRS signal on a first one of the plurality of directional beams from the first base station and a second PRS signal from a second one of the plurality of directional beams second base station based on the schedule, which is based on the coordination of the PRS transmissions.

In some embodiments of the inventive concept, a positioning node comprises a processor; and a memory coupled to the processor and comprising computer readable program code embodied in the memory that is executable by the processor to perform operations comprising: receiving from each of a plurality of base stations information comprising a plurality of configurable beam directions suitable for Positioning Reference Signal (PRS) transmissions; communicating, for each of the plurality of base stations, a schedule associated with transmissions by the respective base station of a PRS on the plurality of directional beams to a User Equipment (UE), the schedule being based on a coordination of the PRS transmissions on the plurality of directional beams by the plurality of base stations; and receiving from the UE Reference Signal Time Different Measurement (RSTD) information based on a first PRS signal transmitted by a first one of the plurality of base stations, a second PRS signal transmitted by a second one of the plurality of base stations, and a third PRS signal transmitted by a third one of the plurality of base stations.

Further Definitions and Embodiments

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method of operating a base station, comprising:
   determining a schedule associated with transmission by the base station of a Positioning Reference Signal (PRS) on a plurality of directional beams, the plurality of directional beams having directions corresponding to at least a portion of a plurality of configurable beam directions, the schedule being based on a coordination of the PRS transmission by the base station with PRS transmission on directional beams from at least one other base station; and
   transmitting the PRS on each of the plurality of directional beams based on the determined schedule,
   wherein the schedule is a resource allocation schedule that identifies time segments and sub-frequencies used for transmission by the base station of the PRS on the plurality of directional beams;
   the method further comprising:
   assigning beam index identifications to the plurality of directional beams, respectively, the beam index identifications corresponding to pairs of time segment and sub-frequency identifications, respectively;
   wherein the resource allocation schedule is based on the beam index identifications.

2. The method of claim 1, wherein the base station is a first base station, wherein the at least one other base station comprises a second base station, and wherein the schedule for the transmission of the PRS on each of the plurality of directional beams is determined by coordinating the PRS transmissions from the first base station with PRS transmissions scheduled to be transmitted on directional beams from the second base station such that the PRS transmissions from the first base station and the PRS transmissions from the second base station occur within a predetermined time period.

3. The method of claim 2, wherein the schedule for the transmission of the PRS on each of the plurality of directional beams is determined such that the PRS transmissions transmitted from the first base station are coordinated with the PRS transmissions scheduled to be transmitted on the directional beams from the second base station in a defined geographic region.

4. The method of claim 2, wherein the schedule for the transmission of the PRS on each of the plurality of directional beams is determined such that the PRS transmissions transmitted from the first base station are coordinated with the PRS transmissions scheduled to be transmitted on the directional beams from the second base station based on reducing interference between the PRS transmissions transmitted from the first base station and PRS transmissions transmitted from the second base station through multiplexing of first resources associated with the PRS transmissions transmitted from the first base station and second resources associated with PRS transmissions transmitted from the second base station;

wherein the first resources comprise first sub-frequencies and first time segments and the second resources comprise second sub-frequencies and second time segments; and wherein a length of the predetermined time period is based on a movement characteristic of a User Equipment (UE) within a defined geographic region.

5. The method of claim 1, wherein determining the schedule for the transmission of the PRS on each of the plurality of directional beams comprises:

generating the schedule for the transmission of the PRS on each of the plurality of directional beams so as to complete the transmission of the PRS on each of the plurality of beams within a PRS burst interval wherein the PRS burst interval is a first one of a plurality of PRS burst intervals, the method further comprising:

generating the schedule for the transmission of the PRS on each of the plurality of directional beams so as to complete the transmission of the PRS on each of the plurality of beams within each of the plurality PRS burst intervals.

6. The method of claim 1, further comprising:

communicating the schedule, a number of the at least the portion of a plurality of configurable beam directions, a number of the plurality of configurable beam directions, the beam index identifications, bandwidths of the plurality of directional beams, respectively, or time domain characteristics of the plurality of directional beams, respectively, to a positioning node;

wherein the schedule is based on the beam index identifications.

7. The method of claim 6, wherein communicating the schedule, the number of the at least the portion of a plurality of configurable beam directions, the number of the plurality of configurable beam directions, the beam index identifications, the bandwidths of the plurality of directional beams, respectively, or the time domain characteristics of the plurality of directional beams, respectively, to the positioning node is performed following transmission of a Synchronization Signal Block (SSB).

8. A method of operating a User Equipment (UE), comprising:

receiving from a positioning node, for each of a first base station and a second base station, information associated with transmission of a Positioning Reference Signal (PRS) on a plurality of directional beams, the information comprising a schedule that is based on a coordination of the PRS transmissions on the plurality of directional beams by the first base station and the second base station, and the plurality of directional beams having directions corresponding to at least a portion of a plurality of configurable beam directions, respectively;

receiving a first PRS signal on a first one of the plurality of directional beams from the first base station and a second PRS signal from a second one of the plurality of directional beams from the second base station based on the schedule, which is based on the coordination of the PRS transmissions; and communicating, to a positioning node, a beam index identification assigned to the one of the plurality of directional beams on which the first PRS signal is received, wherein the schedule is a resource allocation schedule that identifies time segments and sub-frequencies used for PRS transmissions by the first base station and the second base station on the plurality of directional beams; and wherein the beam index identifications correspond to pairs of the time segment and sub-frequency identifications, respectively.

9. The method of claim 8, further comprising:

performing Observed Time Difference of Arrival (OTDOA) measurements based on the first PRS signal, the second PRS signal, and a third PRS signal received from a third base station; and communicating Reference Signal Time Different Measurement (RSTD) information based on the OTDOA measurements.

10. The method of claim 8, wherein the information associated with transmission by the first base station of the PRS signal on the plurality of directional beams comprises a number of the at least the portion of a plurality of configurable beam directions, a number of the plurality of configurable beam directions, the beam index identifications assigned to ones of the plurality of directional beams, respectively, bandwidths of the plurality of directional beams, respectively, or time domain characteristics of the plurality of directional beams, respectively.

11. The method of claim 8, further comprising:

communicating an Angle of Arrival (AoA) associated with the one of the plurality of directional beams on which the first PRS signal is received or an Angle of Departure (AoD) associated with the one of the plurality of directional beams on which the first PRS signal is received.

12. A method of operating a positioning node, comprising:

receiving from each of a plurality of base stations information comprising a plurality of configurable beam directions suitable for Positioning Reference Signal (PRS) transmissions;

communicating, for each of the plurality of base stations, a schedule associated with transmissions by the respective base station of a PRS on the plurality of directional beams to a User Equipment (UE), the schedule being based on a coordination of the PRS transmissions on the plurality of directional beams by the plurality of base stations; and receiving from the UE, Reference Signal Time Different Measurement (RSTD) information based on a first PRS signal transmitted by a first one of the plurality of base stations, a second PRS signal transmitted by a second one of the plurality of base stations, and a third PRS signal transmitted by a third one of the plurality of base stations, wherein the schedule is a resource allocation schedule that identifies time segments and sub-frequencies used for transmission by the respective base stations of the PRS on the plurality of directional beams;

receiving, from the UE, for each of the first, second, and third ones of the plurality of base stations: a beam index identification assigned to the one of the plurality of directional beams on which the PRS signal is transmitted; and wherein the beam index identifications correspond to pairs of the time segment and the sub-frequency identifications, respectively.

13. The method of claim 12, further comprising:

communicating, by the positioning node, the schedule to the plurality of base stations, prior to communication of the schedule to the UE, wherein the schedule is generated by the positioning node based on the information received from the plurality of base stations, and wherein the plurality of directional beams have directions corresponding to at least a portion of a plurality of configurable beam directions.

14. The method of claim 13, wherein the received information further comprises: a number of the at least the portion of a plurality of configurable beam directions, a number of the plurality of configurable beam directions, the beam index identifications assigned to ones of the plurality of directional beams, respectively, bandwidths of the plurality of directional beams, respectively, or time domain characteristics of the plurality of directional beams, respectively.

15. The method of claim 12, further comprising:

receiving, from the UE, for each of the first, second, and third ones of the plurality of base stations: an Angle of Arrival (AoA) associated with the one of the plurality of directional beams on which the PRS signal is transmitted, or an Angle of Departure (AoD) associated with the one of the plurality of directional beams on which the PRS signal is transmitted.

16. The method of claim 15, further comprising:

determining an Observed Time Difference of Arrival (OTDOA) position for the UE based on the RSTD information, the respective beam index identifications, the respective AoAs, or the respective AoDs.

17. The method of any of claim 12, wherein the schedule is determined such that transmissions of the PRS on the plurality of directional beams by respective ones of the plurality of base stations are coordinated between the respective ones of the plurality of base stations so as to occur within a predetermined time period.

18. The method of claim 12, wherein the schedule is determined such that transmissions of the PRS on the plurality of directional beams by respective ones of the plurality of base stations are coordinated between the respective ones of the plurality of base stations in a defined geographic region.

19. The method of claim 12, wherein the schedule is determined such that transmissions of the PRS on the plurality of directional beams by respective ones of the plurality of base stations are coordinated between the respective ones of the plurality of base stations based on, for each of the plurality of base stations, reducing interference between the transmissions of the PRS on the plurality of directional beams by the respective one of the plurality of base stations and transmissions on another respective one of the plurality of base stations through multiplexing of first resources associated with the PRS transmissions transmitted from the respective one of the plurality of base stations and second resources associated with the PRS transmissions transmitted from the other respective one of the plurality of base stations.

* * * * *